(12) United States Patent
Yatsu et al.

(10) Patent No.: US 11,885,321 B2
(45) Date of Patent: Jan. 30, 2024

(54) CRYOPUMP, CRYOPUMP SYSTEM, AND METHOD FOR STARTING OPERATION OF CRYOPUMP

(71) Applicant: SUMITOMO HEAVY INDUSTRIES, LTD., Tokyo (JP)

(72) Inventors: Takahiro Yatsu, Tokyo (JP); Toshiyuki Kimura, Tokyo (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/730,496

(22) Filed: Apr. 27, 2022

(65) Prior Publication Data
US 2022/0397108 A1 Dec. 15, 2022

Related U.S. Application Data

(63) Continuation of application No. PCT/JP2020/039093, filed on Oct. 16, 2020.

(30) Foreign Application Priority Data
Oct. 29, 2019 (JP) ................ 2019-196122

(51) Int. Cl.
F04B 37/08 (2006.01)
F04B 25/00 (2006.01)

(52) U.S. Cl.
CPC .......... F04B 37/085 (2013.01); F04B 25/00 (2013.01)

(58) Field of Classification Search
CPC ........ F04B 37/085; F04B 37/08; B01D 53/04
See application file for complete search history.

(56) References Cited

U.S. PATENT DOCUMENTS 5,114,316 A   5/1992 Shimizu
5,345,787 A * 9/1994 Piltingsrud ............. F04B 37/08
                                                    62/55.5
(Continued)

FOREIGN PATENT DOCUMENTS

JP   S51-137674 A   11/1976
JP   H03-258976 A   11/1991
(Continued)

OTHER PUBLICATIONS

International Search Report issued in Application No. PCT/JP2020/039093, dated Nov. 24, 2020.

Primary Examiner — Lionel Nouketcha
(74) Attorney, Agent, or Firm — Michael Best & Friedrich LLP

(57) ABSTRACT

A cryopump includes a cryopanel disposed in a cryopump housing and including a non-combustible adsorbent, a heater heating the non-combustible adsorbent and the cryopanel, a purge valve connecting the cryopump housing to a purge gas source, a rough valve connecting the cryopump housing to a rough pump, a sensor that generates a measurement signal indicating a temperature of the non-combustible adsorbent or an internal pressure of the cryopump housing, and a controller that controls at least one of the heater, the purge valve, and the rough valve based on the measurement signal so as to execute either a sublimation regeneration sequence for sublimating water from the non-combustible adsorbent by exposing the non-combustible adsorbent to a vacuum atmosphere or a dehydration sequence for dehydrating the non-combustible adsorbent by exposing the non-combustible adsorbent to a dry atmosphere at room temperature or a temperature higher than the room temperature.

21 Claims, 12 Drawing Sheets

(56) References Cited

U.S. PATENT DOCUMENTS

| | | |
|---|---|---|
| 6,332,925 B1 | 12/2001 | Noji et al. |
| 9,415,325 B2 | 8/2016 | Fukuda |
| 9,440,165 B2 | 9/2016 | Takahashi |
| 2013/0219924 A1* | 8/2013 | Fukuda .................... B01D 8/00 62/55.5 |
| 2015/0267693 A1* | 9/2015 | Oikawa ................ F04B 37/085 62/55.5 |

FOREIGN PATENT DOCUMENTS

| | | |
|---|---|---|
| JP | H05-263760 A | 10/1993 |
| JP | H10-073078 A | 3/1998 |
| JP | 2013-170568 A | 9/2013 |
| JP | 2013-181448 A | 9/2013 |

\* cited by examiner

FIG. 2

|  | AVERAGE PORE SIZE [nm] | PACKING DENSITY [g/mL] | PORE VOLUME [mL/g] | SPECIFIC SURFACE AREA [m²/g] |
|---|---|---|---|---|
| SILICA GEL A TYPE | 2.5 | 0.73 | 0.40 | 650 |
| SILICA GEL N TYPE | 2.1 | 0.80 | 0.32 | 600 |
| SILICA GEL RD TYPE | 2.2 | 0.73 | 0.40 | 720 |
| SILICA GEL B TYPE | 6.7 | 0.50 | 0.75 | 450 |
| SILICA GEL ID TYPE | 17.9 | 0.33 | 1.30 | 290 |

CRYOPUMP, CRYOPUMP SYSTEM, AND METHOD FOR STARTING OPERATION OF CRYOPUMP

RELATED APPLICATIONS

The contents of Japanese Patent Application No. 2019-196122, and of International Patent Application No. PCT/JP2020/039093, on the basis of each of which priority benefits are claimed in an accompanying application data sheet, are in their entirety incorporated herein by reference.

BACKGROUND

Technical Field

Certain embodiments of the present invention relate to a cryopump, a cryopump system, and a method for starting an operation of a cryopump.

Description of Related Art

A cryopump is a vacuum pump which captures gas molecules on a cryopanel cooled to a cryogenic temperature by condensation or adsorption to exhaust the gas molecules. The cryopump is generally used to realize a clean vacuum environment which is required for a semiconductor circuit manufacturing process or the like. Since the cryopump is a so-called gas accumulation type vacuum pump, regeneration to periodically discharge the captured gas to the outside is required.

SUMMARY

According to an embodiment of the present invention, there is provided a cryopump including: a cryopump housing; a cryopanel disposed in the cryopump housing and provided with a non-combustible adsorbent; a heater that heats the non-combustible adsorbent and the cryopanel; a purge valve that is mounted to the cryopump housing and connects the cryopump housing to a purge gas source; a rough valve that is mounted to the cryopump housing and connects the cryopump housing to a rough pump; a sensor that generates a measurement signal indicating a temperature of the non-combustible adsorbent or an internal pressure of the cryopump housing; and a controller that receives a regeneration start command and controls at least one of the heater, the purge valve, and the rough valve based on the measurement signal so as to execute either (i) a sublimation regeneration sequence or (ii) a dehydration sequence, the sublimation regeneration sequence configured to sublimate water from the non-combustible adsorbent by exposing the non-combustible adsorbent to a vacuum atmosphere, the dehydration sequence configured to dehydrate the non-combustible adsorbent by exposing the non-combustible adsorbent to a dry atmosphere having a higher pressure than the vacuum atmosphere, at room temperature or a temperature higher than the room temperature.

According to another embodiment of the present invention, there is provided a cryopump including: a cryopump housing; a cryopanel disposed in the cryopump housing and provided with a non-combustible adsorbent; a heater that heats the non-combustible adsorbent and the cryopanel; a purge valve that is mounted to the cryopump housing and connects the cryopump housing to a purge gas source; a rough valve that is mounted to the cryopump housing and connects the cryopump housing to a rough pump; and a controller that controls at least one of the heater, the purge valve, and the rough valve according to a dehydration sequence, and controls the rough valve to create a vacuum atmosphere in the cryopump housing following the dehydration sequence. The dehydration sequence is configured to dehydrate the non-combustible adsorbent by exposing the non-combustible adsorbent to a dry atmosphere having a higher pressure than the vacuum atmosphere, at room temperature or a temperature higher than the room temperature.

According to still another embodiment of the present invention, there is provided a cryopump including: a non-combustible adsorbent; and a controller that sequentially executes dehydrating the non-combustible adsorbent by exposing the non-combustible adsorbent to a dry atmosphere at room temperature or a temperature higher than the room temperature, evacuating an environment around the non-combustible adsorbent after the dehydration of the non-combustible adsorbent, and cooling the non-combustible adsorbent to a cryogenic temperature in a vacuum atmosphere, in order to start an evacuation operation of the cryopump.

According to still yet another embodiment of the present invention, there is provided a method for starting an operation of a cryopump. The cryopump has a non-combustible adsorbent. The operation starting method includes dehydrating the non-combustible adsorbent by exposing the non-combustible adsorbent to a dry atmosphere at room temperature or a temperature higher than the room temperature, evacuating an environment around the non-combustible adsorbent after the dehydration of the non-combustible adsorbent, and cooling the non-combustible adsorbent to a cryogenic temperature in a vacuum atmosphere.

Any combination of the constituent elements described above, or replacement of constituent elements or expressions of the present invention with each other between methods, apparatuses, systems, or the like is also valid as an aspect of the present invention.

BRIEF DESCRIPTION OF THE DRAWINGS

FIG. 2 is a table showing typical physical properties of silica gel that can be used as a non-combustible adsorbent that forms an adsorption region according to an embodiment.

DETAILED DESCRIPTION

Figure 1:
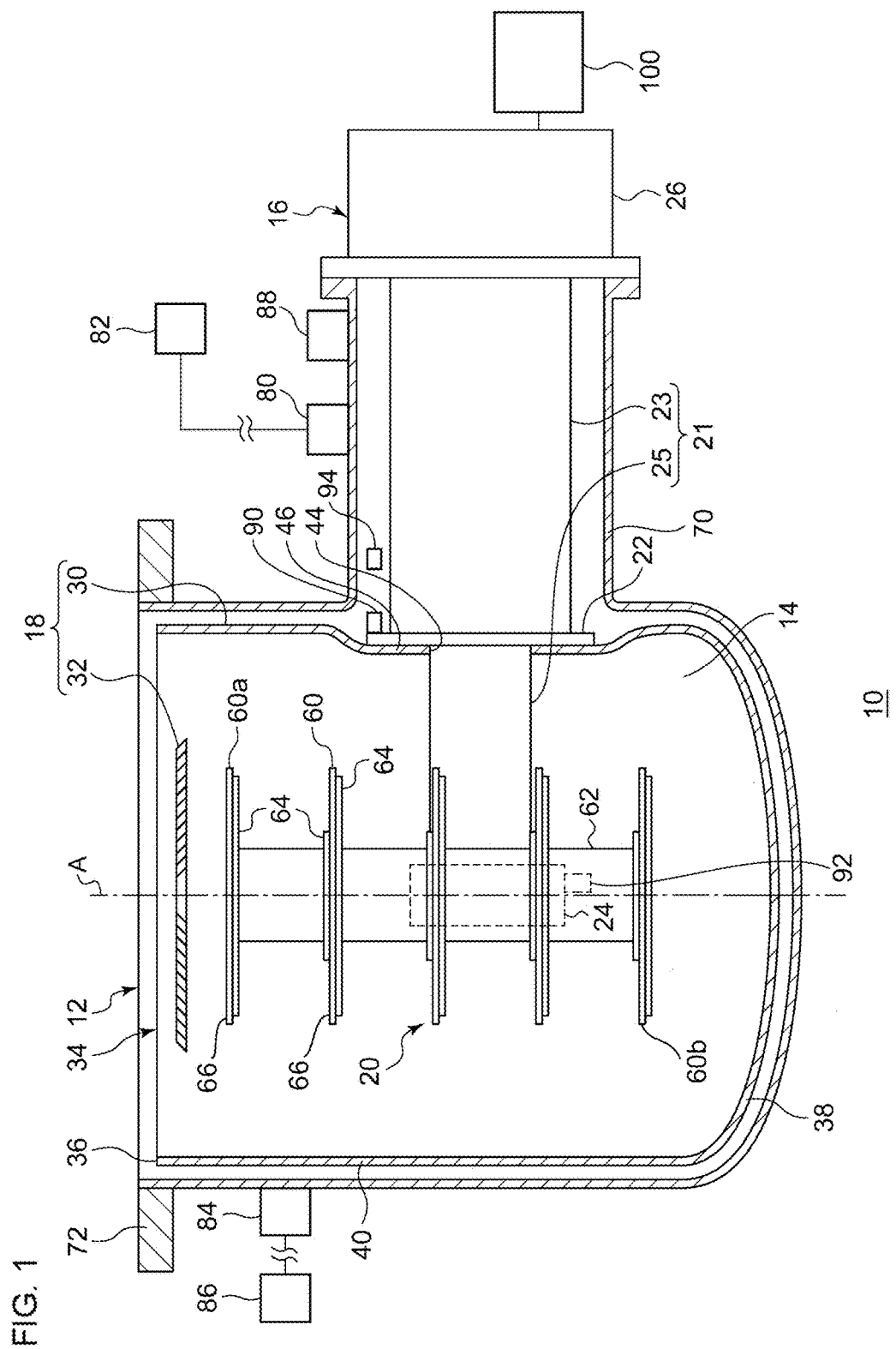
FIG. 1 is a diagram schematically showing a cryopump according to an embodiment.

The cryopump has an adsorbent on the cryopanel in order to adsorb a non-condensable gas such as hydrogen, which does not condense on the cryopanel. The adsorbent is typically activated carbon, and in some uses, a gas containing oxygen or ozone is exhausted by the cryopump. In this case, the activated carbon may be exposed to an oxygen atmosphere during regeneration. Since the activated carbon is a combustible material, accidental ignition may occur for some reason.

The inventors of the present invention considered the feasibility of a cryopump using an alternative adsorbent other than activated carbon in order to minimize safety risk. However, it has been found that such an alternative adsorbent tends to be crushed into powder due to various factors such as a usage environment, as compared with activated carbon. If the adsorbent is damaged, the exhaust performance of the cryopump deteriorates. Further, the crushed powder may scatter and invade components of the cryopump to adversely affecting the components. For example, adsorbent powder may be caught in a valve attached or connected to the cryopump, causing valve leakage.

It is desirable to provide a novel cryopump equipped with an alternative adsorbent that exhausts a non-condensable gas.

According to the present invention, it is possible to provide a novel cryopump equipped with an alternative adsorbent that exhausts a non-condensable gas.

Hereinafter, modes for carrying out the present invention will be described in detail with reference to the drawings. In the description, identical elements will be denoted by the same reference symbols and overlapping description will be omitted appropriately. Further, the configuration which is described below is exemplification and does not limit the scope of the present invention. Further, in the drawings which are referred to in the following description, the size or thickness of each constituent member is for convenience of description, and does not necessarily indicate actual dimension or ratio.

FIG. 1 schematically shows a cryopump 10 according to an embodiment. The cryopump 10 is mounted to a vacuum chamber of, for example, an ion implanter, a sputtering apparatus, a vapor deposition apparatus, or other vacuum process equipment and is used to increase the degree of vacuum in the interior of the vacuum chamber to a level which is required for a desired vacuum process. The cryopump 10 has an intake port 12 for receiving a gas to be exhausted, from the vacuum chamber. The gas enters an internal space 14 of the cryopump 10 through the intake port 12.

In the following, there is a case where the terms "axial direction" and "radial direction" are used in order to express the positional relationship between constituent elements of the cryopump 10 in an easily understandable manner. The axial direction represents a direction passing through the intake port 12 (in FIG. 1, a direction along a central axis A), and the radial direction represents a direction along the intake port 12 (a direction perpendicular to the central axis A). For convenience, with respect to the axial direction, there is a case where the side relatively close to the intake port 12 is referred to as an "upper side" and the side relatively distant from the intake port 12 is referred to as a "lower side". That is, there is a case where the side relatively distance from the bottom of the cryopump 10 is referred to as an "upper side" and the side relatively close to the bottom of the cryopump 10 is referred to as a "lower side". With respect to the radial direction, there is a case where the side close to the center (in FIG. 1, the central axis A) of the intake port 12 is referred to as an "inner side" and the side close to the peripheral edge of the intake port 12 is referred to as an "outer side". Such expressions are not related to the disposition when the cryopump 10 is mounted to the vacuum chamber. For example, the cryopump 10 may be mounted to the vacuum chamber with the intake port 12 facing downward in the vertical direction.

Further, there is a case where a direction surrounding the axial direction is referred to as a "circumferential direction". The circumferential direction is a second direction along the intake port 12 and is a tangential direction orthogonal to the radial direction.

The cryopump 10 includes a cryocooler 16, a first cryopanel unit 18, a second cryopanel unit 20, and a cryopump housing 70. The first cryopanel unit 18 may be referred to as a high-temperature cryopanel part or a 100 K part. The second cryopanel unit 20 may be referred to as a low-temperature cryopanel part or a 10 K part.

The cryocooler 16 is a cryocooler such as a Gifford McMahon type cryocooler (a so-called GM cryocooler), for example. The cryocooler 16 is a two-stage cryocooler. Therefore, the cryocooler 16 includes a first cooling stage 22 and a second cooling stage 24. The cryocooler 16 is configured to cool the first cooling stage 22 to a first cooling temperature and cool the second cooling stage 24 to a second cooling temperature. The second cooling temperature is lower than the first cooling temperature. For example, the first cooling stage 22 is cooled to a temperature in a range of about 65 K to 120 K, preferably, in a range of 80 K to 100 K, and the second cooling stage 24 is cooled to a temperature in a range of about 10 K to 20 K. The first cooling stage 22 and the second cooling stage 24 may be referred to as a high-temperature cooling stage and a low-temperature cooling stage, respectively.

Further, the cryocooler 16 includes a cryocooler structure part 21 that structurally supports the second cooling stage 24 on the first cooling stage 22 and structurally supports the first cooling stage 22 on a room temperature part 26 of the cryocooler 16. Therefore, the cryocooler structure part 21 includes a first cylinder 23 and a second cylinder 25 that extend coaxially along the radial direction. The first cylinder 23 connects the room temperature part 26 of the cryocooler 16 to the first cooling stage 22. The second cylinder 25 connects the first cooling stage 22 to the second cooling stage 24. The room temperature part 26, the first cylinder 23, the first cooling stage 22, the second cylinder 25, and the second cooling stage 24 are linearly arranged in this order.

A first displacer and a second displacer (not shown) are reciprocally disposed in the interiors of the first cylinder 23 and the second cylinder 25, respectively. A first regenerator and a second regenerator (not shown) are respectively incorporated into the first displacer and the second displacer. Further, the room temperature part 26 has a drive mechanism (not shown) for reciprocating the first displacer and the second displacer. The drive mechanism includes a flow path switching mechanism that switches a flow path of a working gas (for example, helium) so as to periodically repeat the supply and discharge of the working gas to and from the interior of the cryocooler 16.

The cryocooler 16 is connected to a compressor (not shown) for the working gas. The cryocooler 16 cools the first cooling stage 22 and the second cooling stage 24 by expanding the working gas pressurized by the compressor in the interior thereof. The expanded working gas is recovered to the compressor and pressurized again. The cryocooler 16 generates cold by repeating a heat cycle including the supply and discharge of the working gas and the reciprocation of the first displacer and the second displacer in synchronization with the supply and discharge of the working gas.

The cryopump 10 which is shown in the drawing is a so-called horizontal cryopump. The horizontal cryopump is generally a cryopump in which the cryocooler 16 is disposed so as to intersect (usually, be orthogonal to) the central axis A of the cryopump 10.

The first cryopanel unit 18 includes a radiation shield 30 and an inlet cryopanel 32 and surrounds the second cryopanel unit 20. The first cryopanel unit 18 provides a cryogenic surface for protecting the second cryopanel unit 20 from radiant heat outside the cryopump 10 or from the cryopump housing 70. The first cryopanel unit 18 is thermally coupled to the first cooling stage 22. Accordingly, the first cryopanel unit 18 is cooled to the first cooling temperature. The first cryopanel unit 18 has a gap between itself and the second cryopanel unit 20, and the first cryopanel unit 18 is not in contact with the second cryopanel unit 20. The first cryopanel unit 18 is also not in contact with the cryopump housing 70.

The first cryopanel unit 18 can also be referred to as a condensation cryopanel. The second cryopanel unit 20 can also be referred to as an adsorption cryopanel.

The radiation shield 30 is provided in order to protect the second cryopanel unit 20 from the radiant heat of the cryopump housing 70. The radiation shield 30 is located between the cryopump housing 70 and the second cryopanel unit 20 and surrounds the second cryopanel unit 20. The radiation shield 30 has a shield main opening 34 for receiving gas from the outside of the cryopump 10 into the internal space 14. The shield main opening 34 is located at the intake port 12.

The radiation shield 30 is provided with a shield front end 36 defining the shield main opening 34, a shield bottom portion 38 which is located on the side opposite to the shield main opening 34, and a shield side portion 40 connecting the shield front end 36 to the shield bottom portion 38. The shield side portion 40 extends in the axial direction from the shield front end 36 to the side opposite to the shield main opening 34, and extends so as to surround the second cooling stage 24 in the circumferential direction.

The shield side portion 40 has a shield side portion opening 44 into which the cryocooler structure part 21 is inserted. The second cooling stage 24 and the second cylinder 25 are inserted into the radiation shield 30 from outside the radiation shield 30 through the shield side portion opening 44. The shield side portion opening 44 is a mounting hole formed in the shield side portion 40 and is, for example, circular. The first cooling stage 22 is disposed outside the radiation shield 30.

The shield side portion 40 is provided with a mounting seat 46 for the cryocooler 16. The mounting seat 46 is a flat portion for mounting the first cooling stage 22 to the radiation shield 30, and is slightly depressed when viewed from outside the radiation shield 30. The mounting seat 46 forms the outer periphery of the shield side portion opening 44. The first cooling stage 22 is mounted to the mounting seat 46, whereby the radiation shield 30 is thermally coupled to the first cooling stage 22.

Instead of directly mounting the radiation shield 30 to the first cooling stage 22 in this manner, in an embodiment, the radiation shield 30 may be thermally coupled to the first cooling stage 22 through an additional heat transfer member.

In the illustrated embodiment, the radiation shield 30 is configured in an integral tubular shape. Instead, the radiation shield 30 may be configured to have a tubular shape as a whole by a plurality of parts. The plurality of parts may be disposed with a gap therebetween. For example, the radiation shield 30 may be divided into two parts in the axial direction.

The inlet cryopanel 32 is provided in the intake port 12 (or the shield main opening 34, the same applies hereinafter) in order to protect the second cryopanel unit 20 from the radiant heat from a heat source outside the cryopump 10 (for example, a heat source in the vacuum chamber to which the cryopump 10 is mounted). Further, gas (for example, moisture) condensing at the cooling temperature of the inlet cryopanel 32 is captured on the surface thereof.

The inlet cryopanel 32 is disposed at a place corresponding to the second cryopanel unit 20 in the intake port 12. The inlet cryopanel 32 occupies at least the central portion of the opening area of the intake port 12. The inlet cryopanel 32 has a planar structure disposed in the intake port 12. The inlet cryopanel 32 may include, for example, a louver or a chevron formed in a concentric circle shape or a lattice shape, or may include a flat plate (for example, a disk).

The inlet cryopanel 32 is mounted to the shield front end 36 through a mounting member (not shown). In this manner, the inlet cryopanel 32 is fixed to the radiation shield 30 and is thermally connected to the radiation shield 30. The inlet cryopanel 32 is adjacent to, but not in contact with, the second cryopanel unit 20.

The second cryopanel unit 20 is provided at the central portion of the internal space 14 of the cryopump 10. The second cryopanel unit 20 includes a plurality of cryopanels 60 and a panel mounting member 62. The panel mounting member 62 extends axially upward and downward from the second cooling stage 24. The second cryopanel unit 20 is mounted to the second cooling stage 24 through the panel mounting member 62. In this way, the second cryopanel unit 20 is thermally connected to the second cooling stage 24. Accordingly, the second cryopanel unit 20 is cooled to the second cooling temperature.

The plurality of cryopanels 60 are arranged on the panel mounting member 62 along the direction from the shield main opening 34 to the shield bottom portion 38 (that is, along the central axis A). The plurality of cryopanels 60 each are a flat plate (for example, a disk) that extends perpendicularly to the central axis A, and are mounted on the panel mounting member 62 in parallel with each other. The cryopanel 60 is not limited to a flat plate, and the shape thereof is not particularly limited. For example, the cryopanel 60 may have an inverted truncated cone shape or a truncated cone shape.

The plurality of cryopanels 60 may have the same shape as shown, or may have different shapes (for example, different diameters). Any cryopanel 60 of the plurality of cryopanels 60 may have the same shape as the upper cryopanel 60 adjacent thereto, or may have a larger size than that. Further, the intervals between the plurality of cryopanels 60 may be constant as shown, or may be different from each other.

In the second cryopanel unit 20, a non-combustible adsorbent 64 is disposed on at least a part of the surface thereof. The non-combustible adsorbent 64 is provided in order to capture a non-condensable gas (for example, hydrogen) by adsorption, and forms an adsorption region on the cryopanel 60. The adsorption region may be formed in a place that is hidden behind the cryopanel 60 adjacent to the upper side so as not to be seen from the intake port 12. For example, the adsorption region is formed on the entire lower surface (back surface) of the cryopanel 60. Further, the adsorption region may be formed in at least the central portion of the upper surface (front surface) of the cryopanel 60.

The non-combustible adsorbent 64 may be a granular adsorbent, and the adsorption region may be formed by bonding the granular adsorbents to the surface of the cryopanel 60. The particle size of the adsorbent may be, for example, in a range of 2 mm to 5 mm. In this way, the bonding work at the time of manufacturing becomes easier.

In this embodiment, the non-combustible adsorbent 64 contains silica gel as a main component thereof. The non-combustible adsorbent 64 may include at least about 50 mass percent, at least about 60 mass percent, at least about 70 mass percent, at least about 80 mass percent, or at least about 90 mass percent of silica gel. Substantially all of the non-combustible adsorbents 64 may be silica gel. Since the silica gel contains silicon dioxide as a main component thereof, it does not chemically react with oxygen.

In this manner, the adsorption region is formed of a porous body made of an inorganic substance and does not contain an organic substance. Unlike a typical cryopump, the cryopump 10 does not include activated carbon.

As typical parameters related to the adsorption characteristic of the porous body, there are an average pore size, packing density, pore volume, and a specific surface area. As commonly available silica gel, there are several types such as silica gel A type, silica gel B type, silica gel N type, silica gel RD type, and silica gel ID type, for example. Therefore, these four parameters of each type of silica gel are shown in FIG. 2.

The inventors of the present invention formed an adsorption region on the cryopanel 60 by bonding each type of granular silica gel to the cryopanel 60, and measured a hydrogen storage capacity under common conditions. It was found that the silica gel A type, the silica gel RD type, and the silica gel N type adsorb more hydrogen than the silica gel B type and the silica gel ID type. The measurement results of the hydrogen storage capacity per unit area of the adsorption region are shown below with respect to the silica gel A type, the silica gel N type, and the silica gel RD type.

Silica gel A type: 251 (L/m$^2$)
Silica gel RD type: 195 (L/m$^2$)
Silica gel N type: 179 (L/m$^2$)

Therefore, the silica gel A type, the silica gel RD type, and the silica gel N type are expected to be suitable for practical use as an adsorbent for the non-condensable gas, which is used in the cryopump 10. The silica gel B type and the silica gel ID type may also be usable as an adsorbent for the non-condensable gas in the use in which the required storage capacity is relatively small.

It is considered that the storage capacity for the non-condensable gas by a certain adsorbent is improved as the average pore size of the adsorbent is smaller, for the following two reasons. First, this is because the smaller the diameter of the pore is, the greater the number of pores per unit area on the surface of the adsorbent can become. As a result, the surface area where the gas is adsorbed increases, and thus the gas molecules are easily adsorbed.

Further, the adsorption is caused by a physical interaction between the surface of the adsorbent and gas molecules, for example, intermolecular force. The smaller the diameter of the pore is, the closer the size of the pore is to the size of the gas molecule. Then, when gas molecules enter the pores, the inner wall surface of the pore is more likely to exist within a distance range in which interaction can occur around the gas molecules. The interaction between the gas molecules and the wall surface of the pore easily occurs, and thus the gas molecules are easily adsorbed. This is the second reason.

Based on these findings, the silica gel preferably has an average pore size of 3.0 nm or less in order to obtain good non-condensable gas adsorption characteristics. Further, since the size of hydrogen molecule is about 0.1 nm, the silica gel preferably has a larger average pore size than that, for example, an average pore size of 0.5 nm or more.

More preferably, the silica gel has an average pore size in a range of 2.0 nm to 3.0 nm. As can be seen from FIG. 2, the silica gel A type, the silica gel RD type, and the silica gel N type have average pore sizes included in this preferable range. The average pore sizes of the silica gel B type and the silica gel ID type are considerably larger than this range.

When the average pore sizes of the silica gel A type, the silica gel RD type, and the silica gel N type are compared with each other, the silica gel A type has a larger average pore size than the other two types. However, the silica gel A type has a larger hydrogen storage capacity per unit area, as described above. The reason why the silica gel A type gives good results in this way is that the silica gel A type is easy to obtain granular silica gel having a uniform shape. The uniform granular silica gel is easy to be closely arranged and bonded to the surface of the cryopanel. Therefore, the silica gel A type can be installed on the cryopanel 60 at higher density as compared with irregular-shaped granular silica gel and can increase the storage capacity.

Further, in addition to having an average pore size in the range described above, the silica gel preferably has packing density in a range of 0.7 to 0.9 g/mL, pore volume in a range of 0.25 to 0.45 mL/g, and a specific surface area in a range of 550 to 750 m$^2$/g. The silica gel having such physical properties is expected to have good adsorption characteristic, as in the silica gel A type, the silica gel RD type, and the silica gel N type.

A condensation region 66 for capturing a condensable gas by condensation is formed on at least a part of the surface of the second cryopanel unit 20. The condensation region 66 is, for example, a section where the adsorbent is missing on the surface of the cryopanel, and the surface of a cryopanel base material, for example, a metal surface is exposed. For example, the outer peripheral portion of the upper surface of the cryopanel 60 may be the condensation region 66.

The cryopump housing 70 is a casing of the cryopump 10, which accommodates the first cryopanel unit 18, the second cryopanel unit 20, and the cryocooler 16, and is a vacuum container configured to maintain the vacuum tightness of the internal space 14. The cryopump housing 70 includes the first cryopanel unit 18 and the cryocooler structure part 21 in a non-contact manner. The cryopump housing 70 is mounted to the room temperature part 26 of the cryocooler 16.

The intake port 12 is defined by a front end of the cryopump housing 70. The cryopump housing 70 has an intake port flange 72 extending radially outward from a front end thereof. The intake port flange 72 is provided over the entire circumference of the cryopump housing 70. The cryopump 10 is mounted to a vacuum chamber to be evacuated by using the intake port flange 72.

A rough valve 80, a purge valve 84, and a vent valve 88 are mounted to the cryopump housing 70.

The rough valve 80 is connected to a rough pump 82. By the opening and closing of the rough valve 80, the rough pump 82 and the cryopump 10 communicate with each other or are shut off from each other. By opening the rough valve 80, the rough pump 82 and the cryopump housing 70 communicate with each other, and by closing the rough valve 80, the rough pump 82 and the cryopump housing 70 are shut off from each other. By opening the rough valve 80 and operating the rough pump 82, the interior of the cryopump 10 can be decompressed.

The rough pump 82 is a vacuum pump for evacuating the cryopump 10. The rough pump 82 is a vacuum pump for providing the cryopump 10 with a low vacuum region in an operating pressure range of the cryopump 10, in other words, a base pressure level which is an operation starting pressure of the cryopump 10. The rough pump 82 can reduce the pressure in the cryopump housing 70 from atmospheric pressure to a base pressure level. The base pressure level corresponds to a high vacuum region of the rough pump 82 and is included in an overlapping portion of the operating pressure ranges of the rough pump 82 and the cryopump 10. The base pressure level is, for example, in a range of 1 Pa or more and 50 Pa or less (for example, about 10 Pa).

The rough pump 82 is typically provided as a vacuum device separate from the cryopump 10, and configures a part of a vacuum system including a vacuum chamber to which the cryopump 10 is connected, for example. The cryopump 10 is a main pump for the vacuum chamber and the rough pump 82 is an auxiliary pump.

The purge valve 84 is connected to a purge gas supply device which includes a purge gas source 86. By the opening and closing of the purge valve 84, the purge gas source 86 and the cryopump 10 communicate with each other or is shut off from each other, and thus the supply of a purge gas to the cryopump 10 is controlled. By opening the purge valve 84, the flow of the purge gas from the purge gas source 86 to the cryopump housing 70 is permitted. By closing the purge valve 84, the flow of the purge gas from the purge gas source 86 to the cryopump housing 70 is shut off. By opening the purge valve 84 and introducing the purge gas from the purge gas source 86 into the cryopump housing 70, the pressure in the interior of the cryopump 10 can be increased. The supplied purge gas is discharged from the cryopump 10 through the rough valve 80.

The temperature of the purge gas is adjusted to, for example, room temperature. However, in an embodiment, the purge gas may be a gas heated to a temperature higher than room temperature or a gas slightly lower than room temperature. In the present specification, room temperature is a temperature selected from the range of 10° C. to 30° C. or the range of 15° C. to 25° C., and is, for example, about 20° C. The purge gas is, for example, nitrogen gas. The purge gas may be a dry gas.

The vent valve 88 is provided in order to discharge a fluid from the interior of the cryopump 10 to the external environment. The vent valve 88 is normally closed, but can be mechanically opened by the pressure difference between the external pressure and the internal pressure of the cryopump housing 70. By opening the vent valve 88, the positive pressure generated in the interior of the cryopump housing 70 can be released to the outside. The fluid that is discharged from the vent valve 88 is basically a gas, but may be a liquid or a mixture of gas and liquid.

The cryopump 10 is provided with a heating device that heats the non-combustible adsorbent 64 and the cryopanel 60. The heating device is, for example, the cryocooler 16. The cryocooler 16 enables a temperature rise operation (so-called reverse temperature rise). That is, the cryocooler 16 is configured such that adiabatic compression occurs in the working gas when a drive mechanism provided in the room temperature part 26 operates in the direction opposite to the cooling operation. The cryocooler 16 heats the first cooling stage 22 and the second cooling stage 24 with compression heat which is obtained in this way. The first cryopanel unit 18 and the second cryopanel unit 20 are respectively heated by using the first cooling stage 22 and the second cooling stage 24 as heat sources.

In a case where the heated purge gas is supplied, the purge valve 84 may be considered to configure a part of the heating device. Alternatively, the cryopump 10 may be provided with a heating device such as an electric heater, for example. For example, an electric heater that can be controlled independently of the operation of the cryocooler 16 may be mounted to the first cooling stage 22 and/or the second cooling stage 24 of the cryocooler 16.

The cryopump 10 includes a first temperature sensor 90 for measuring the temperature of the first cooling stage 22, and a second temperature sensor 92 for measuring the temperature of the second cooling stage 24. The first temperature sensor 90 is mounted to the first cooling stage 22. The second temperature sensor 92 is mounted to the second cooling stage 24. Therefore, the first temperature sensor 90 can measure the temperature of the first cryopanel unit 18, and the second temperature sensor 92 can measure the temperature of the second cryopanel unit 20. The measurement temperature of the second temperature sensor 92 is considered to indicate the temperature of the non-combustible adsorbent 64. Further, in a case where the temperature of the entire cryopump 10 is uniform (for example, at room temperature) such as before the start of an operation of the cryopump 10, the measurement temperature of the first temperature sensor 90 is considered to indicate the temperature of the non-combustible adsorbent 64.

Further, a pressure sensor 94 is provided inside the cryopump housing 70. The pressure sensor 94 is provided in the vicinity of the cryocooler 16 outside the first cryopanel unit 18, for example. The pressure sensor 94 can measure the internal pressure of the cryopump housing 70.

The cryopump 10 includes a controller 100 that controls the operation (for example, an evacuation operation, a regeneration operation, or the like) of the cryopump 10. The controller 100 may also be referred to as a cryopump controller or a regeneration controller.

Although the details will be described later, the controller 100 is configured to be able to execute a dehydration sequence for drying the non-combustible adsorbent 64 (hereinafter, also referred to as a basic dehydration sequence). The dehydration sequence is configured to dehydrate the non-combustible adsorbent 64 by exposing the non-combustible adsorbent 64 to a dry atmosphere having a higher pressure (for example, at least 1000 Pa) than the vacuum atmosphere, at room temperature or a temperature higher than the room temperature. The controller 100 controls at least one of the heating device, the purge valve 84, and the rough valve 80 according to the dehydration sequence. The controller 100 controls the rough valve 80 to create a vacuum atmosphere (for example, less than 100 Pa) in the cryopump housing 70 following the dehydration sequence. The controller 100 controls the cryocooler 16 to provide cryogenic cooling in this vacuum atmosphere.

As mentioned at the beginning of this specification, the typical cryopump of the related art uses activated carbon as an adsorbent, and in some uses, a gas containing oxygen or ozone is exhausted by the cryopump. In this case, the activated carbon is exposed to an oxygen atmosphere during regeneration. Since the activated carbon is a combustible material, accidental ignition may occur due to some factors.

In order to reduce the possibility of an accident, it is important to avoid the coexistence of multiple risk factors.

According to the embodiment, since the cryopump 10 has the non-combustible adsorbent 64, ignition and combustion of the adsorbent are reliably prevented even in the presence of oxygen, for example. Unlike the related art, the coexistence of multiple risk factors (activated carbon and oxygen) can be avoided, and thus the risk of ignition can be eliminated. Therefore, the safety of the cryopump 10 is improved. It is possible to provide the cryopump 10 suitable for the use in which oxygen is contained in the gas to be exhausted.

The non-combustible adsorbent 64 is not limited to silica gel. It is also conceivable to use another inorganic porous body such as a molecular sieve as the non-combustible adsorbent 64. If it is an inorganic adsorbent, the safety is similarly improved.

However, using silica gel as in the present embodiment has an advantage of facilitating the regeneration of the cryopump 10. The adsorption characteristic of a porous body generally has a temperature dependence in which the amount of adsorption decreases as the temperature rises. That is, when the porous body is heated, the gas adsorbed thereto is easily released. The silica gel has a significantly reduced adsorption characteristic at a high temperature, as compared with other inorganic porous bodies. Therefore, the non-combustible adsorbent 64 containing silica gel is easily regenerated.

Incidentally, when the cryopump 10 is shipped from the manufacturer, it is delivered to the user in a state where a lid is attached to the intake port 12. The interior of the cryopump 10 may be filled with nitrogen gas or other clean dry gas. The cryopump 10 delivered to the user is stored with the lid attached thereto. The user removes the lid from the intake port 12 at the site where the cryopump 10 is used, and mounts the cryopump 10 to the vacuum chamber. Then, the cryopump 10 is evacuated to a base pressure (for example, a minute pressure of less than 100 Pa) by the rough pump 82 through the rough valve 80, and the cooling operation of the cryocooler 16 is started. The first cryopanel unit 18 and the second cryopanel unit 20 are cooled to a cryogenic temperature, and the evacuation operation of the cryopump 10 is started.

In a case where the user does not properly store the cryopump 10, such as when the cryopump 10 is left with the lid removed, the non-combustible adsorbent 64 may come into contact with the atmosphere for a long period of time and adsorb a large amount of moisture. When the non-combustible adsorbent 64 is exposed to the atmosphere for a long period of time due to poor storage, the moisture absorptivity of the non-combustible adsorbent 64 (mass ratio, for example, the amount of absorbed water per 1 g of the non-combustible adsorbent 64) may reach at least 30%.

The inventors of the present invention have considered that if the cryopump 10 is evacuated in order to start an operation in such a situation, a previously unknown phenomenon occurs in which the non-combustible adsorbent 64 immediately breaks into powder. This phenomenon does not occur in the cryopump of the related art that has activated carbon as an adsorbent.

This is a problem. If the non-combustible adsorbent 64 is damaged, the exhaust performance for the non-condensable gas of the cryopump deteriorates. Further, if the crushed powder of the non-combustible adsorbent 64 is caught in the valve attached or connected to the cryopump 10, such as the rough valve 80 or the purge valve 84, a leak may occur in the valve. If a leak occurs in the rough valve 80 or the purge valve 84, vacuum is not maintained in the cryopump 10, and thus maintenance such as valve replacement is required. The crushed powder may invade other components of the cryopump 10, such as sensors, and adversely affect the components.

This new phenomenon is considered to be based on a mechanism in which the surroundings of the non-combustible adsorbent 64 are rapidly decompressed due to evacuation and moisture is rapidly vaporized and desorbed from the non-combustible adsorbent 64, causing local cooling or thermal stress in the interior of the adsorbent, and as a result, the non-combustible adsorbent 64 is destroyed. Such crushing is remarkable in a case where the non-combustible adsorbent 64 is formed of silica gel. However, there is a possibility that it may also be generated in other inorganic adsorbents such as zeolite, for example, by the same mechanism.

The inventors of the present invention have experimentally found that if the moisture absorptivity of the non-combustible adsorbent 64 is less than 24% (preferably less than 20%), the non-combustible adsorbent 64 is prevented from being crushed due to evacuation. Therefore, in the embodiment, the cryopump 10 is configured to execute a dehydration sequence for drying the non-combustible adsorbent 64 in order to start the evacuation operation of the cryopump 10. The drying conditions are set so as to reduce the moisture absorptivity of the non-combustible adsorbent 64 to less than 24% (preferably less than 20%). The drying conditions may include at least one of a heating temperature, the pressure of the dry atmosphere, and a drying time.

Figure 3:
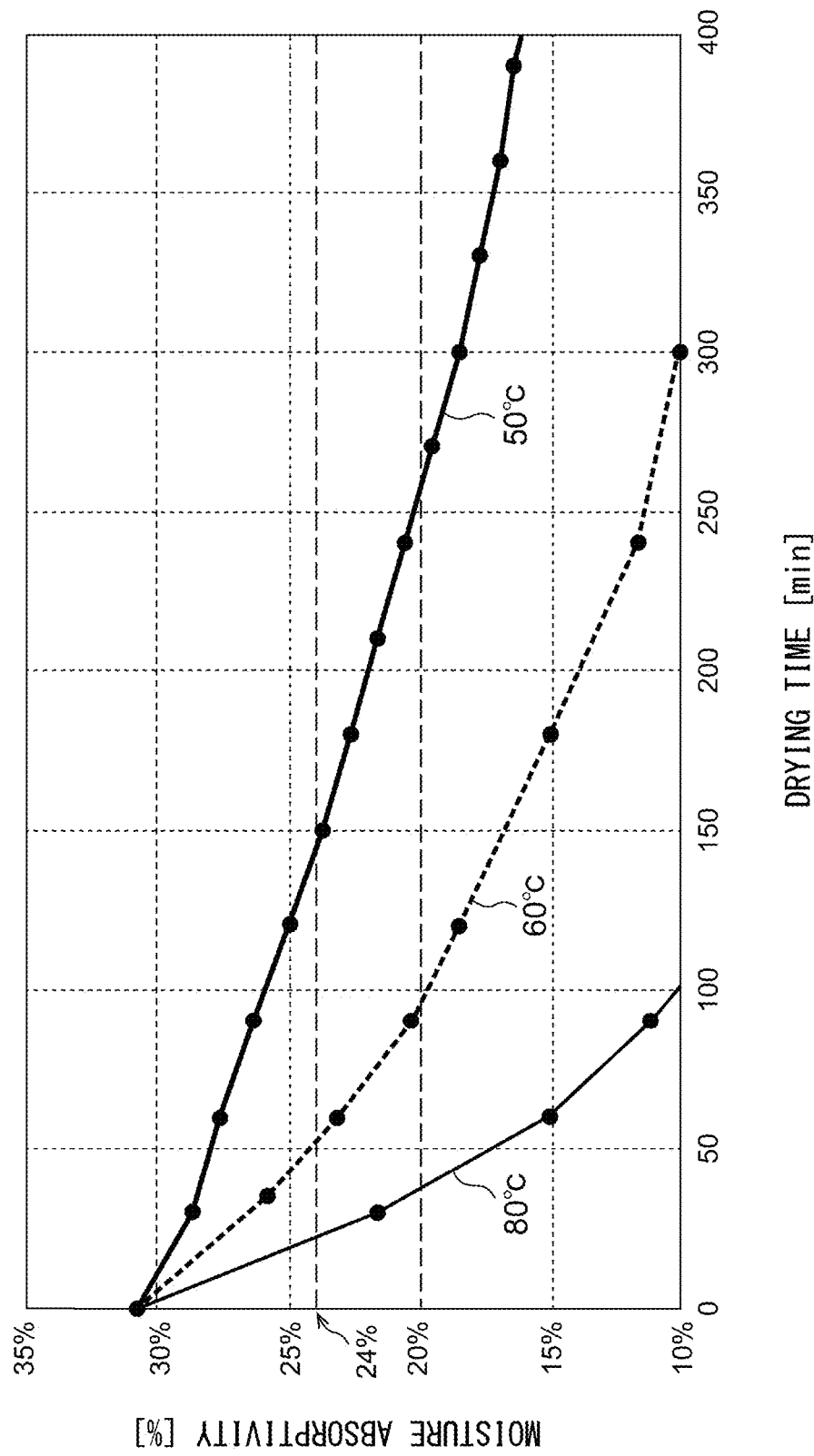
FIG. 3 is a graph showing changes in the moisture absorptivity of the silica gel due to heating.

FIG. 3 is a graph showing changes in the moisture absorptivity of the silica gel due to heating. This is the result obtained by an experiment conducted by the inventors of the present invention, and in FIG. 3, a temporal change in moisture absorptivity when silica gel is heated to a predetermined drying temperature in a drying furnace is plotted. The initial moisture absorptivity is set to 30%, and this simulates a state where silica gel provided in the cryopump is exposed to the atmosphere for a long period of time and adsorbs a large amount of moisture. The test was conducted under atmospheric pressure at three drying temperatures such as 80° C., 60° C., and 50° C.

At any drying temperature, the moisture absorptivity decreases over time and moisture is desorbed from the silica gel. The higher the drying temperature, the faster the moisture absorptivity decreases. At the drying temperature of 80° C., the moisture absorptivity decreases to about 24% in the time in a range of about 20 to 25 minutes from the start of drying, and to about 20% in the time in a range of about 35 to 40 minutes. At the drying temperature of 60° C., the moisture absorptivity decreases to about 24% in about 50 minutes, and to about 20% in about 90 minutes. At the drying temperature of 50° C., the moisture absorptivity decreases to about 24% in about 140 minutes, and to about 20% in about 250 minutes.

Therefore, from the experimental results, it can be seen that it is effective to set the drying temperature to at least 50° C. for the dehydration of the silica gel. The shorter the drying time, the more advantageous it is in practical use. If the drying temperature is set to at least 60° C., the moisture absorptivity can be reduced to about 24% or less within the drying time of about 1 hour or shorter. Further, if the drying temperature is set to at least 80° C., the moisture absorptivity can be reduced to about 24% or less within the drying time of about 30 minutes or shorter.

Therefore, the drying temperature (target heating temperature) of the non-combustible adsorbent 64 may be a temperature (for example, 30° C. or higher, or 40° C. or higher) higher than room temperature, and preferably at least 50° C. (for example, 60° C. or higher, or 70° C. or higher), and more preferably at least 80° C. (for example, 90° C. or higher).

If the drying temperature is too high, there is a risk that it may exceed the heat resistant temperature of the cryopump 10. Therefore, the drying temperature may be 130° C. or lower, 120° C. or lower, 110° C. or lower, 100° C. or lower, or 95° C. or lower.

Figure 4:
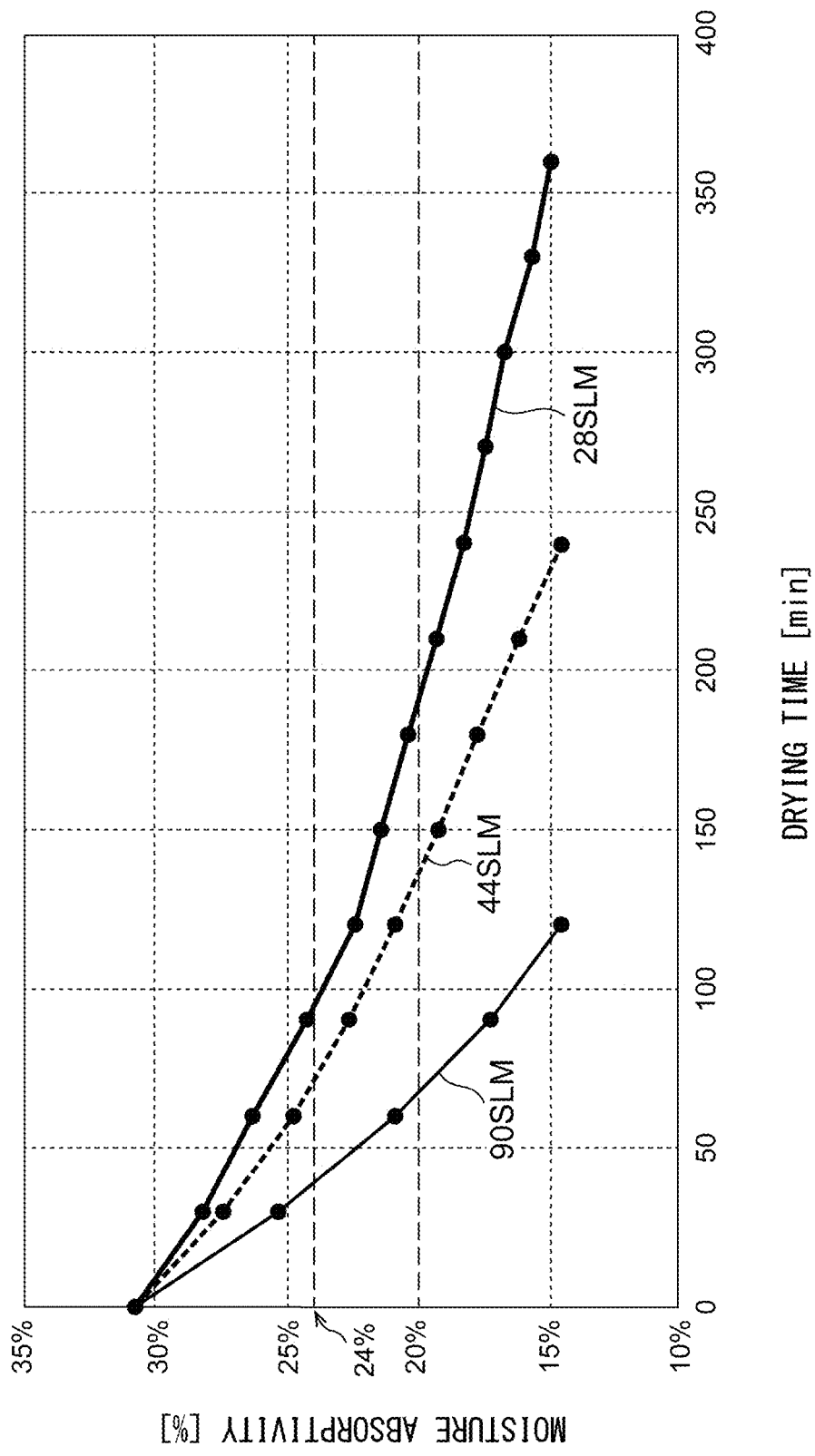
FIG. 4 is a graph showing changes in the moisture absorptivity of the silica gel due to the flow of a purge gas.

FIG. 4 is a graph showing changes in the moisture absorptivity of the silica gel due to the flow of a purge gas. This is also the result obtained by an experiment conducted by the inventors of the present invention, and in FIG. 4, a temporal change in moisture absorptivity when silica gel is dried by supplying a purge gas to a container at a predetermined purge gas flow rate is plotted. The purge gas is dry nitrogen gas. The initial moisture absorptivity is set to 30%. The test was performed under a non-heating condition (that is, at room temperature) at three purge gas flow rates such as 90 SLM (standard liter/min), 44 SLM, and 28 SLM.

At any purge gas flow rate, the moisture absorptivity decreases over time and moisture is desorbed from the silica gel. The greater the purge gas flow rate, the faster the moisture absorptivity decreases. As shown in FIG. 4, for example, in the case of the purge gas flow rate of 90 SLM, the moisture absorptivity decreases to about 24% in about 40 minutes, and to about 20% in about 70 minutes. From the experimental results, it can be seen that the supply of the purge gas is effective for the dehydration of the silica gel. The dehydration is also possible by supplying the purge gas alone, without heating.

Figure 5:
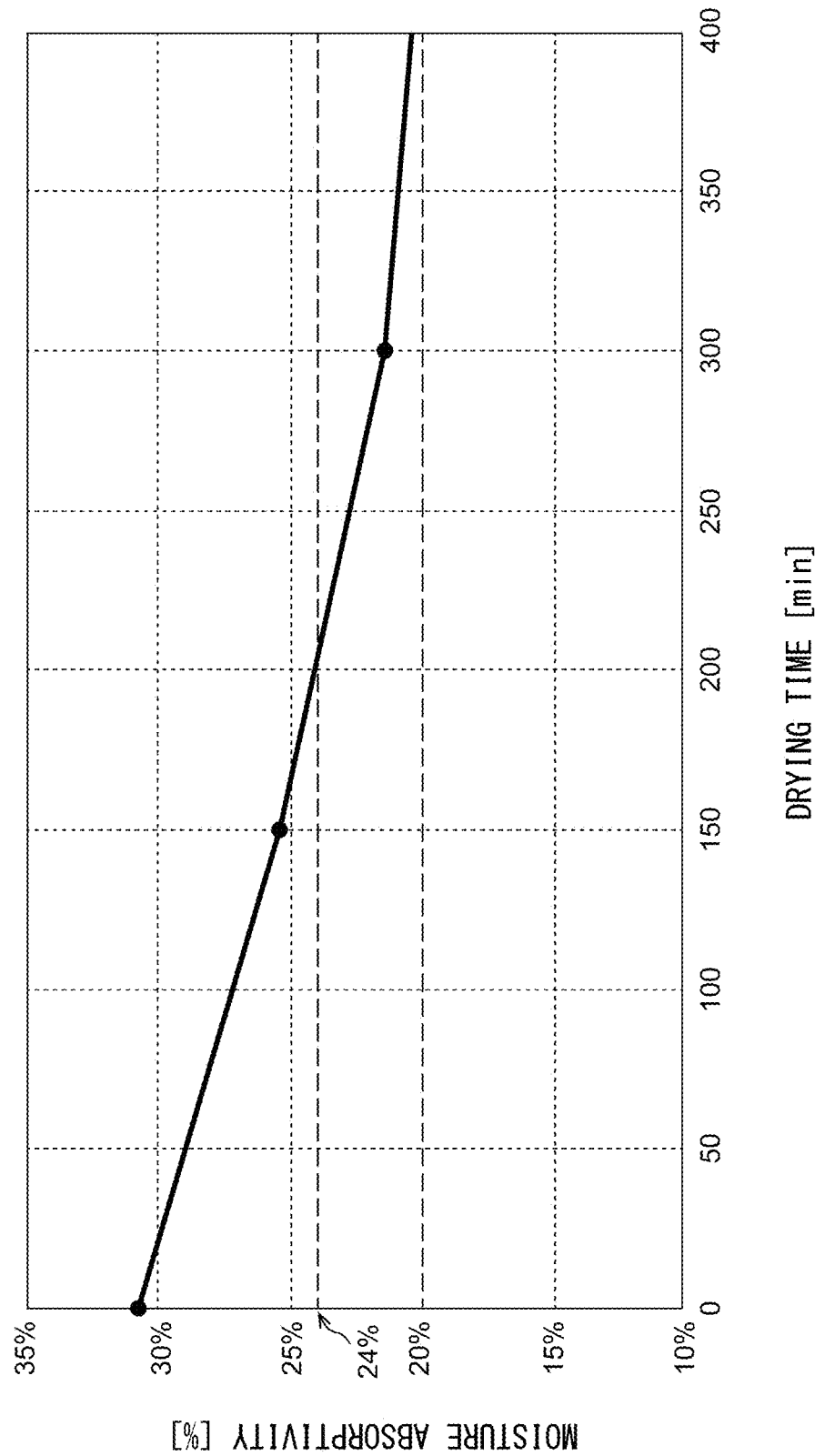
FIG. 5 is a graph showing changes in the moisture absorptivity of the silica gel in a low-pressure dry atmosphere.

FIG. 5 is a graph showing changes in the moisture absorptivity of the silica gel in a low-pressure dry atmosphere. This is also the result obtained by an experiment conducted by the inventors of the present invention, and in FIG. 5, a temporal change in moisture absorptivity when silica gel is held in a low-pressure dry atmosphere in a range of 1000 to 1100 Pa is plotted. Similarly, the initial moisture absorptivity is set to 30%. There is no supply of a purge gas to the dry atmosphere and heating is also not performed.

Also by setting the dry atmosphere to a pressure lower than the atmospheric pressure, the moisture absorptivity decreases over time and moisture is desorbed from the silica gel. As shown in FIG. 5, in the low-pressure dry atmosphere in a range of 1000 to 1100 Pa, the moisture absorptivity decreases to about 24% in about 200 minutes, and to about 20% in about 400 minutes. In the case, no crushing of the silica gel is observed. From the experimental results, it can be seen that setting the dry atmosphere to a pressure lower than the atmospheric pressure is effective for the dehydration of the silica gel. The pressure of the dry atmosphere may be, for example, at least 1000 Pa, at least 0.1 atm, or at least 1 atm.

Figure 6:
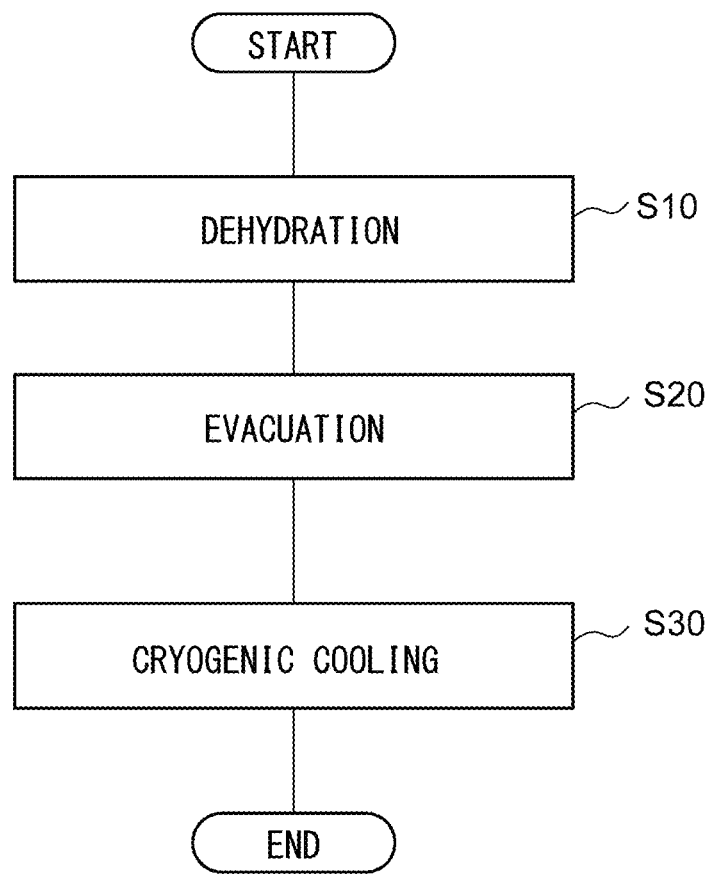
FIG. 6 is a flowchart illustrating a method for starting an operation of a cryopump according to an embodiment.

FIG. 6 is a flowchart illustrating a method for starting an operation of the cryopump 10 according to an embodiment. This method includes dehydrating the non-combustible adsorbent 64 by exposing the non-combustible adsorbent 64 to a dry atmosphere at room temperature or a temperature higher than the room temperature (S10). As described above, the drying condition is set so as to reduce the moisture absorptivity of the non-combustible adsorbent 64 to less than 24% (preferably less than 20%).

The dehydration process of the non-combustible adsorbent 64 includes forming a dry atmosphere around the non-combustible adsorbent 64 by at least one of heating the non-combustible adsorbent 64 to a drying temperature (for example, 50° C. or higher, or 80° C. or higher) higher than room temperature, supplying a purge gas to the cryopump housing 70, and holding the cryopump housing 70 at a pressure higher than 1000 Pa (for example, a pressure of atmospheric pressure or higher). The non-combustible adsorbent 64 is heated by a heating device (for example, the reverse temperature rise of the cryocooler 16, the supply of a high-temperature purge gas, or the operation of an electric heater provided in the cryocooler 16 or the cryopanel 60). The supply of the purge gas is controlled by the purge valve 84. The decompression of the cryopump housing 70 is controlled by the rough valve 80.

After the dehydration of the non-combustible adsorbent 64 (S10), evacuation of the environment around the non-combustible adsorbent 64 is performed (S20). The rough valve 80 is opened and the rough pump 82 is operated. The cryopump housing 70 is roughly evacuated to the base pressure by the rough pump 82 through the rough valve 80. As described above, the base pressure is, for example, less than 100 Pa. A vacuum atmosphere is formed around the non-combustible adsorbent 64.

The non-combustible adsorbent 64 is cooled to a cryogenic temperature in a vacuum atmosphere (S30). The cooling operation of the cryocooler 16 is started, and the first cooling stage 22 and the second cooling stage 24 are cooled to the first cooling temperature and the second cooling temperature, respectively. Therefore, the first cryopanel unit 18 and the second cryopanel unit 20 thermally coupled to the first cooling stage 22 and the second cooling stage 24 are also cooled to the first cooling temperature and the second cooling temperature, respectively. Since the non-combustible adsorbent 64 is provided in the second cryopanel unit 20, the non-combustible adsorbent 64 is also cooled to the second cooling temperature.

The controller 100 according to the embodiment is configured to execute the method for starting an operation of the cryopump 10 shown in FIG. 6. The controller 100 is configured to sequentially execute, in order to start the evacuation operation of the cryopump 10, (a) dehydrating the non-combustible adsorbent 64 by exposing the non-combustible adsorbent 64 to a dry atmosphere at room temperature or a temperature higher than the room temperature, (b) evacuating an environment around the non-combustible adsorbent 64 after the dehydration of the non-combustible adsorbent 64, and (c) cooling the non-combustible adsorbent 64 to a cryogenic temperature in a vacuum atmosphere.

In this way, the evacuation operation of the cryopump 10 is started. The inlet cryopanel 32 cools the gas which comes flying from the vacuum chamber toward the cryopump 10. A gas having a sufficiently low vapor pressure (for example, $10^{-8}$ Pa or lower) at the first cooling temperature condenses on the surface of the inlet cryopanel 32. This gas may be referred to as a type 1 gas. The type 1 gas is, for example, water vapor. In this way, the inlet cryopanel 32 can exhaust the type 1 gas. A part of a gas in which vapor pressure is not sufficiently low at the first cooling temperature enters the internal space 14 from the intake port 12. Alternatively, the other part of the gas is reflected by the inlet cryopanel 32 and does not enter the internal space 14.

The gas that has entered the internal space 14 is cooled by the second cryopanel unit 20. A gas having a sufficiently low vapor pressure (for example, $10^{-8}$ Pa or lower) at the second cooling temperature condenses on the surface of the second cryopanel unit 20. This gas may be referred to as a type 2 gas. The type 2 gas may be, for example, argon. In this way, the second cryopanel unit 20 can exhaust the type 2 gas.

A gas in which vapor pressure is not sufficiently low at the second cooling temperature is adsorbed by the non-combustible adsorbent 64 of the second cryopanel unit 20. This gas may be referred to as a type 3 gas. The type 3 gas is also referred to as a non-condensable gas and is, for example, hydrogen. In this way, the second cryopanel unit 20 can exhaust the type 3 gas. Therefore, the cryopump 10 can exhaust various gases by condensation or adsorption and can make the degree of vacuum of the vacuum chamber reach a desired level.

The exhaust operation is continued, whereby gas continues to accumulate in the cryopump 10. The regeneration of the cryopump 10 is performed in order to discharge the accumulated gas to the outside. A case where water vapor is contained in a gas which is exhausted to the cryopump is not uncommon. During the evacuation operation of the cryopump 10, water vapor is condensed in the first cryopanel unit 18 and becomes ice. During the regeneration, the cryopump 10 is heated to room temperature or a temperature higher than room temperature (for example, a temperature in a range of 290 K to 330 K), and therefore, the ice melts into water. Water droplets may adhere to the adsorbent.

Silica gel is a kind of hydrophilic material having an OH group. When such a hydrophilic adsorbent comes into contact with liquid water, hydrogen bonds are easily formed between the molecules of the adsorbent and water molecules. Since the hydrogen bond is a strong bond, dehydration of the adsorbent requires a considerable amount of time, and it is expected that the regeneration time will become long. This is not desirable. In addition, silica gel has the property of becoming brittle when it is immersed in liquid water, and then spontaneously shattering. Therefore, in a case where the non-combustible adsorbent 64 contains silica gel, it is particularly desirable to avoid the contact with liquid water. Activated carbon, which is often used in the related art, is a hydrophobic material unlike silica gel.

Therefore, the regeneration of the cryopump 10 is performed by sublimating ice to vaporize it into water vapor without passing through liquid water, and discharge the water vapor to the outside. An embodiment in which the dehydration sequence of the non-combustible adsorbent 64 is incorporated into such sublimation regeneration and implemented will be described below.

Figure 7:
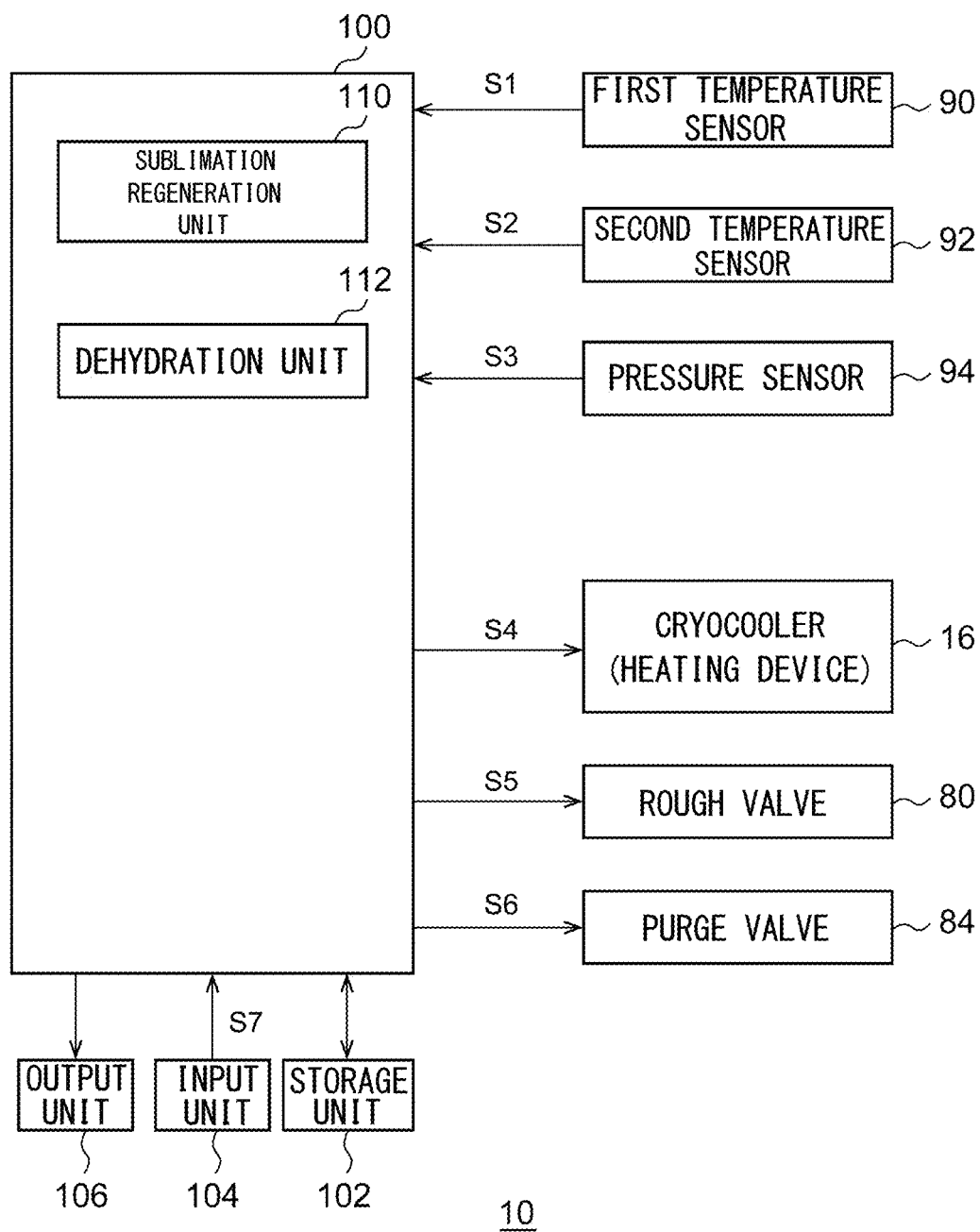
FIG. 7 is a block diagram of a cryopump according to an embodiment.

FIG. 7 is a block diagram of the cryopump 10 according to an embodiment.

The first temperature sensor 90 periodically measures the temperature of the first cryopanel unit 18 and generates a first temperature measurement signal S1 indicating the measured temperature of the first cryopanel unit 18. The first temperature sensor 90 is communicably connected to the controller 100 and outputs the first temperature measurement signal S1 to the controller 100. The second temperature sensor 92 periodically measures the temperature of the second cryopanel unit 20 and generates a second temperature measurement signal S2 indicating the measured temperature of the second cryopanel unit 20. The second temperature sensor 92 is communicably connected to the controller 100 and outputs the second temperature measurement signal S2 to the controller 100.

The pressure sensor 94 periodically measures the internal pressure of the cryopump housing 70 and generates a pressure measurement signal S3 indicating the internal pressure of the cryopump housing 70. The pressure sensor 94 is communicably connected to the controller 100 and outputs the pressure measurement signal S3 to the controller 100.

The controller 100 is configured to receive the first temperature measurement signal S1, the second temperature measurement signal S2, and the pressure measurement signal S3. The controller 100 is configured to generate at least one of a cryocooler control signal S4, a rough valve control signal S5, and a purge valve control signal S6, based on at least one of the first temperature measurement signal S1, the second temperature measurement signal S2, and the pressure measurement signal S3. The controller 100 is configured to transmit the cryocooler control signal S4 to the cryocooler 16, transmit the rough valve control signal S5 to the rough valve 80, and transmit the purge valve control signal S6 to the purge valve 84.

The cryocooler 16 is controlled according to the cryocooler control signal S4. The on/off of the cooling operation or the on/off of the reverse temperature rise operation of the cryocooler 16 and the switching between the cooling operation and the reverse temperature rise operation are based on the cryocooler control signal S4. Further, the operation frequency of the cryocooler 16 (corresponding to the rotation speed of a motor for driving the cryocooler 16) may be variably controlled according to the cryocooler control signal S4. The rough valve 80 is opened or closed according to the rough valve control signal S5. The purge valve 84 is opened or closed according to the purge valve control signal S6. Further, the controller 100 may control a heating device provided in the cryopump 10 (for example, an electric heater mounted on the cryocooler 16) so as to switch the on/off of the heating device.

The cryopump 10 includes a storage unit 102, an input unit 104, and an output unit 106. The storage unit 102 is configured to store data related to control of the cryopump 10. The storage unit 102 may be a semiconductor memory or another data storage medium. The input unit 104 is configured to receive an input from a user or another device. The input unit 104 includes, for example, input means, such as a mouse or a keyboard, for receiving an input from a user, and/or communication means for communicating with another device. The output unit 106 is configured to output data related to the control of the cryopump 10, and includes output means such as a display or a printer. The storage unit 102, the input unit 104, and the output unit 106 are communicably connected to the controller 100.

The controller 100 includes a sublimation regeneration unit 110 and a dehydration unit 112. The sublimation regeneration unit 110 is configured to execute the sublimation regeneration sequence, based on the first temperature measurement signal S1, the second temperature measurement signal S2, and the pressure measurement signal S3. The dehydration unit 112 is configured to execute the dehydration sequence, based on the first temperature measurement signal S1, the second temperature measurement signal S2, and the pressure measurement signal S3. The sublimation regeneration unit 110 may be referred to as a sublimation regeneration controller, and the dehydration unit 112 may be referred to as a dehydration controller.

The controller 100 is configured to receive a regeneration start command S7 and start the regeneration of the cryopump 10. The regeneration start command S7 is input to the controller 100 from the input unit 104, for example.

The controller 100 is realized by elements or circuits such as a CPU or a memory of a computer as a hardware configuration, and is realized by a computer program or the like as a software configuration. However, in FIG. 7, they are appropriately depicted as functional blocks which are realized by the cooperation thereof. Those skilled in the art will understand that these functional blocks can be realized in various ways by combining hardware and software.

For example, the controller 100 can be implemented by a combination of a processor (hardware) such as a CPU (Central Processing Unit) or a microcomputer and a software program which is executed by the processor (hardware). Such a hardware processor may be configured by a programmable logic device such as FPGA (Field Programmable Gate Array), or may be a control circuit such as a programmable logic controller (PLC). The software program may be a computer program for causing the controller 100 to execute the regeneration sequence (for example, the sublimation regeneration sequence and the dehydration sequence) of the cryopump 10.

Figure 8:
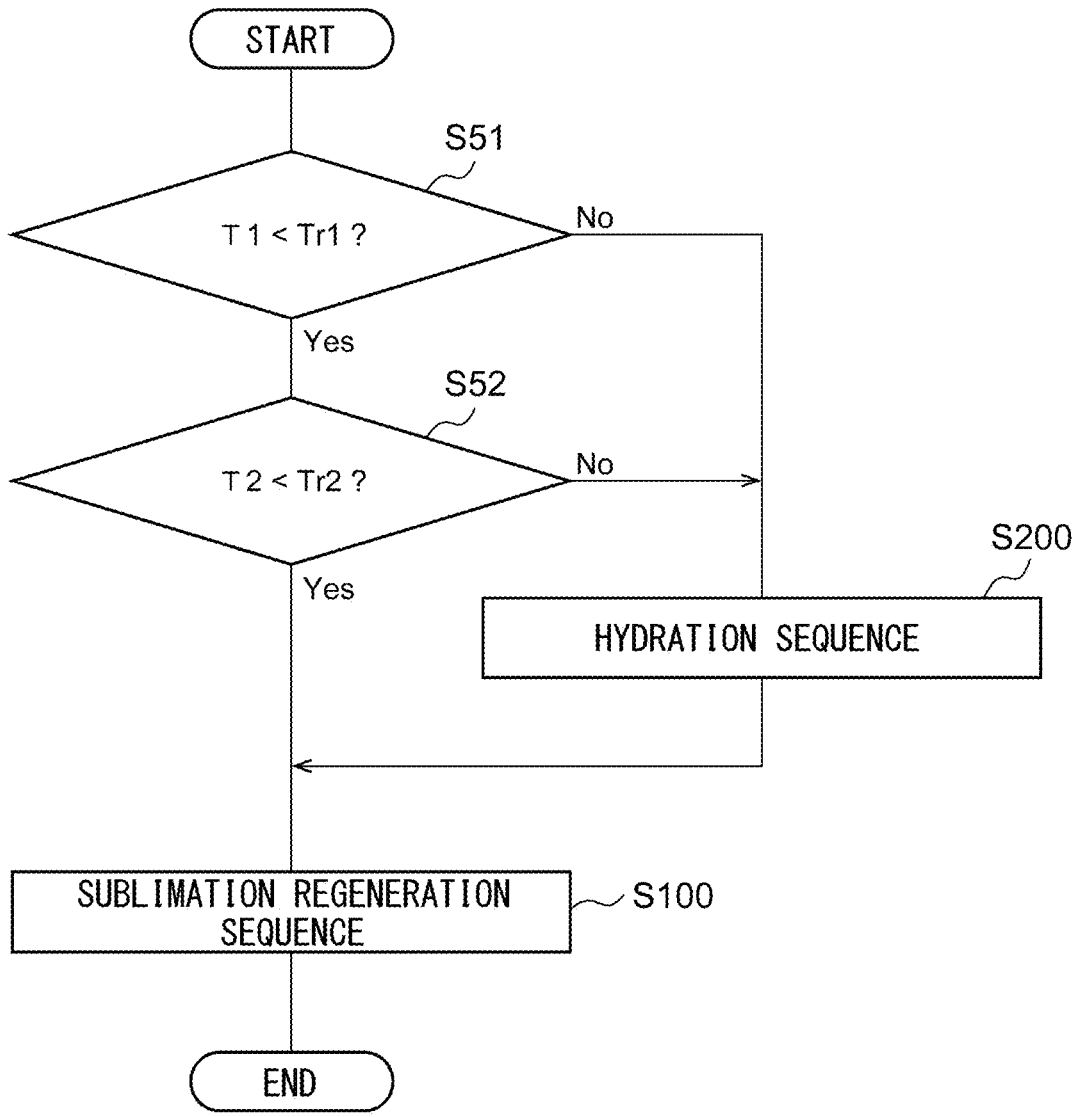
FIG. 8 is a flowchart showing an outline of a cryopump regeneration method according to an embodiment.

FIG. 8 is a flowchart showing an outline of a cryopump regeneration method according to an embodiment. This cryopump regeneration method is executed by the controller 100. The controller 100 receives the regeneration start command S7 and controls the cryocooler 16 as the heating device, the purge valve 84, and the rough valve 80 so as to execute either the sublimation regeneration sequence or the dehydration sequence, based on the temperature measurement signal (for example, at least one of the first temperature measurement signal 51 and the second temperature measurement signal S2) indicating the temperature of the non-combustible adsorbent 64. The sublimation regeneration sequence is configured to sublimate water from the non-combustible adsorbent 64 by exposing the non-combustible adsorbent 64 to a vacuum atmosphere. The dehydration sequence is configured to dehydrate the non-combustible adsorbent 64 by exposing the non-combustible adsorbent 64 to a dry atmosphere having a higher pressure than the vacuum atmosphere, at room temperature or a temperature higher than the room temperature.

When the controller 100 receives the regeneration start command S7, the controller 100 determines, based on the first temperature measurement signal S1, whether or not a first measurement temperature T1, which is the measured temperature of the first cryopanel unit 18, is lower than a first reference temperature Tr1 (S51), as shown in FIG. 8. Further, the controller 100 determines, based on the second temperature measurement signal S2, whether or not a second measurement temperature T2, which is the measured temperature of the second cryopanel unit 20, is lower than a second reference temperature Tr2 (S52).

The determinations based on these temperatures are performed in order to grasp the state of the cryopump 10 immediately before receiving the regeneration start command S7. In a case where the evacuation operation of the cryopump 10 has been performed, the first cryopanel unit 18 and the second cryopanel unit 20 have been cooled to a cryogenic temperature. On the other hand, in a case where the cryopump 10 is newly installed in the vacuum chamber and the evacuation operation should be started from now on, the cryopump 10 is at room temperature. Alternatively, even in a case where a power failure or other abnormal situation occurs and it takes a long time to recover from the power failure, the cryopump 10 is naturally raised in temperature from a cryogenic temperature to room temperature. Therefore, the first reference temperature Tr1 and the second reference temperature Tr2 may be set to a temperature value in a range of, for example, 250 K to 280 K in order to distinguish whether the cryopump 10 is cooled to a cryogenic temperature or is at room temperature, and is set to, for example, 273 K. Here, the first reference temperature Tr1 and the second reference temperature Tr2 are set to the same value. However, they may be set to different values.

In a case where the first measurement terperature T1 is lower than the first reference temperature Tr1 and the second measurement terperature T2 is lower than the second reference temperature Tr2 (Yes in S51 and Yes in S52), it can be considered that the evacuation operation of the cryopump 10 has been performed before the controller 100 receives the regeneration start command S7. Therefore, in this case, the sublimation regeneration unit 110 of the controller 100 executes the sublimation regeneration sequence (S100).

On the other hand, in a case where the first measurement temperature T1 is equal to or higher than the first reference temperature Tr1 or the second measurement terperature T2 is equal to or higher than the second reference temperature Tr2 (No in S51 or No in S52), it is considered that the cryopump 10 is at room temperature. Therefore, in this case, the dehydration unit 112 of the controller 100 executes the dehydration sequence (S200). Following the dehydration sequence, the sublimation regeneration unit 110 of the controller 100 executes the sublimation regeneration sequence (S100). In this way, the regeneration of the cryopump 10 is completed. When the regeneration is completed, the cryopump 10 starts the evacuation operation.

In this way, the controller 100 controls at least one of the heating device, the purge valve 84, and the rough valve 80 so as to execute the dehydration sequence in a case where it is considered that the non-combustible adsorbent 64 is at room temperature, based on the temperature measurement signal indicating the temperature of the non-combustible adsorbent 64. Further, the controller 100 controls at least one of the heating device, the purge valve 84, and the rough valve 80 so as to execute the sublimation regeneration sequence in a case where it is considered that the non-combustible adsorbent 64 is at a temperature lower than room temperature, based on the temperature measurement signal indicating the temperature of the non-combustible adsorbent 64.

The controller 100 may receive the regeneration start command S7 and control the cryocooler 16 as the heating device, the purge valve 84, and the rough valve 80 so as to execute either the sublimation regeneration sequence or the dehydration sequence, based on the pressure measurement signal S3. In a case where the evacuation operation of the cryopump 10 has been performed, the interior of the cryopump housing 70 becomes vacuum. On the other hand, in a case where the cryopump 10 is newly installed in the vacuum chamber and the evacuation operation should be started from now on, the pressure in the interior of the cryopump housing 70 becomes atmospheric pressure. Alternatively, even in a case where a power failure or other abnormal situation occurs and it takes a long time to recover from the power failure, the pressure in the interior of the cryopump housing 70 is increased from vacuum to atmospheric pressure (or higher) by re-vaporization of the captured gas. Therefore, the state of the cryopump 10 can be grasped from the internal pressure of the cryopump housing 70.

Alternatively, the controller 100 may control at least one of the heating device, the purge valve, and the rough valve so as to execute either the sublimation regeneration sequence or the dehydration sequence, based on the state of the cryopump 10 immediately before receiving the regeneration start command S7, instead of the measurement signal from the sensor. The controller 100 may be configured to generate status data indicating the current status (for example, during the evacuation operation, new installation, during the regenerating, or the like) of the cryopump 10 and store it in the storage unit 102. The controller 100 may select the sublimation regeneration sequence in a case where the status data immediately before receiving the regeneration start command S7 indicates the evacuation operation, and select the dehydration sequence in a case where the status data immediately before receiving the regeneration start command S7 indicates a new installation.

In this way, in a case where the dehydration sequence is not required, the dehydration sequence can be omitted. It is possible to prevent the regeneration time from becoming long.

Figure 9:
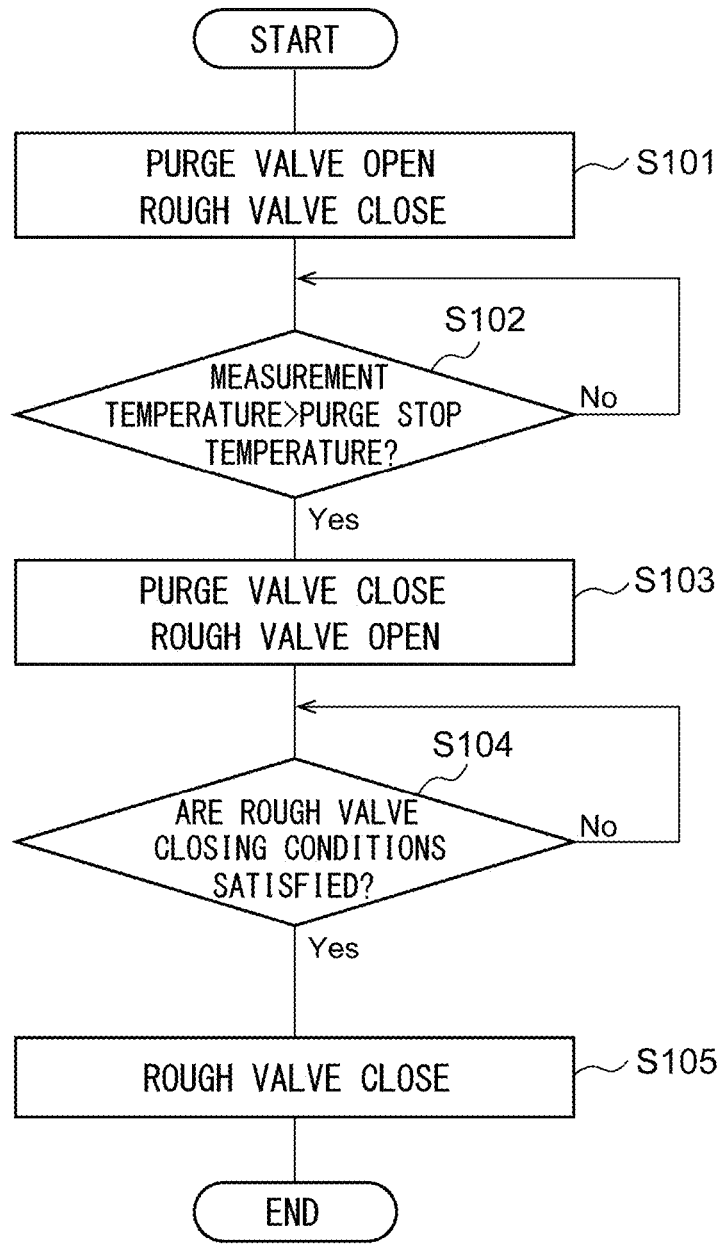
FIG. 9 is a flowchart showing a sublimation regeneration sequence shown in FIG. 8.

FIG. 9 is a flowchart showing the sublimation regeneration sequence shown in FIG. 8. When the sublimation regeneration sequence is started, the sublimation regeneration unit 110 opens the purge valve 84 and closes the rough valve 80 (S101). A purge gas is supplied from the purge gas source 86 to the cryopump housing 70 through the purge valve 84. At the same time, the sublimation regeneration unit 110 starts the reverse temperature rise operation of the cryocooler 16. The sublimation regeneration unit 110 may control the operation frequency of the cryocooler 16 so as to make the first measurement temperature T1 coincide with the target heating temperature, based on the first temperature measurement signal S1.

The sublimation regeneration unit 110 compares the first measurement temperature T1 with a purge stop temperature Tp, based on the first temperature measurement signal S1 (S102). The sublimation regeneration unit 110 controls the rough valve 80 and the rough pump 82, based on the result of the temperature comparison. In a case where the first measurement terperature T1 is lower than the purge stop temperature Tp (No in S102), the current state is maintained. That is, the purge valve 84 is opened and the rough valve 80 is closed. The sublimation regeneration unit 110 compares the first measurement terperature T1 with the purge stop temperature Tp again after the lapse of a predetermined time (S102). The sublimation regeneration unit 110 may compare the second measurement terperature T2 with the purge stop temperature Tp, based on the second temperature measurement signal S2.

The purge stop temperature Tp is set to a temperature value lower than the triple point temperature of water (that is, 273.15 K). The purge stop temperature Tp may be set to a temperature near the triple point temperature of water and lower than that, for example, a temperature in a range of about 230 K to 270 K. The purge stop temperature Tp may be set to 250 K.

In a case where the first measurement terperature T1 is higher than the purge stop temperature Tp (Yes in S102), the sublimation regeneration unit 110 closes the purge valve 84 and opens the rough valve 80 (S103). In this way, the supply of the purge gas to the cryopump 10 is stopped before the temperature of the cryopanel exceeds the triple point temperature of water. The rough valve 80 may be opened with some delay after the purge valve 84 is closed. The sublimation regeneration unit 110 continues the reverse temperature rise operation of the cryocooler 16.

Subsequently, the sublimation regeneration unit 110 determines whether or not the rough valve closing conditions are satisfied (S104). The rough valve closing conditions include the following (a1) and (a2).

(a1) The measured internal pressure of the cryopump housing 70 is lower than a pressure threshold value.
(a2) The measured temperature of the second cryopanel unit 20 is higher than a temperature threshold value.

Therefore, the sublimation regeneration unit 110 compares the measured internal pressure of the cryopump housing 70 with the pressure threshold value, based on the pressure measurement signal S3. The sublimation regeneration unit 110 compares the second measurement terperature T2 with the temperature threshold value, based on the second temperature measurement signal S2. The sublimation regeneration unit 110 controls the rough valve 80 and the purge valve 84, based on the results of these comparisons.

In a case where the measured internal pressure of the cryopump housing 70 is higher than the pressure threshold value (No in S104), the current state is maintained. Even in a case where the measured temperature of the second cryopanel unit 20 is lower than the temperature threshold value (No in S104), the current state is maintained. That is, the rough valve 80 is opened and the purge valve 84 is closed. After the lapse of a predetermined time, it is determined again whether or not the rough valve closing conditions are satisfied (S104).

The pressure threshold value is selected from, for example, a pressure range of 10 Pa to 100 Pa, and may be, for example, 30 Pa. The temperature threshold value is selected from, for example, a temperature range of 290 K to 330 K, and may be, for example, 300 K.

In a case where the rough valve closing conditions are satisfied (Yes in S104), that is, in a case where the measured internal pressure of the cryopump housing 70 is lower than the pressure threshold value and the measured temperature of the second cryopanel unit 20 is higher than the temperature threshold value, the rough valve 80 is closed (S105). The purge valve 84 may be opened at the same time as or with some delay from the closing of the rough valve 80.

After the closing of the rough valve 80 in step S105, a further discharge process and a cool-down process (not shown) are performed, and the sublimation regeneration sequence is ended.

This sublimation regeneration sequence is so-called full regeneration, and both the first cryopanel unit 18 and the second cryopanel unit 20 are regenerated. Therefore, the cryopump 10 is continuously heated and is raised in temperature to room temperature or a regeneration temperature (in a range of 290 K to 330 K, for example) higher than room temperature. In this manner, maintaining the cryopump 10 at a relatively high temperature during the regeneration contributes to shortening of the regeneration time.

The cryopump regeneration according to the embodiment is suitable in a case where the amount of water condensed in the cryopump 10 is small and the internal pressure of the cryopump 10 does not exceed the triple point pressure of water due to sublimation. In a case where a large amount of water is condensed in the cryopump 10, a large amount of water vapor is vaporized by sublimation, and the internal pressure of the cryopump 10 may exceed the triple point pressure of water. In such a case, the controller 100 may maintain the temperature of the cryopump 10 at a temperature lower than the triple point temperature of water, instead of heating the cryopump 10 to a temperature higher than room temperature.

Figure 10:
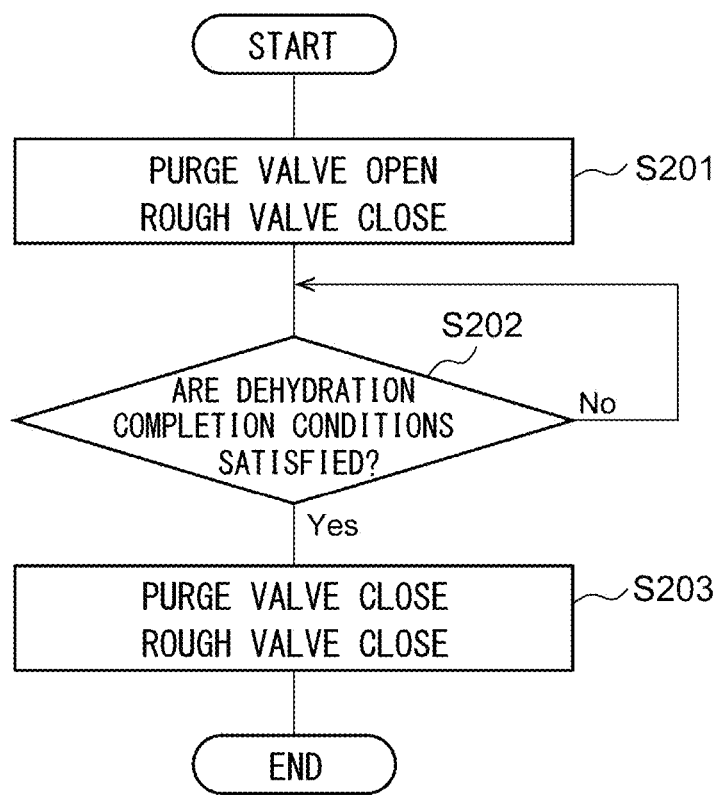
FIG. 10 is a flowchart showing a dehydration sequence shown in FIG. 8.

FIG. 10 is a flowchart showing the dehydration sequence shown in FIG. 8. When the dehydration sequence is started, the dehydration unit 112 opens the purge valve 84 and closes the rough valve 80 (S201). A purge gas is supplied from the purge gas source 86 to the cryopump housing 70 through the purge valve 84. The supplied purge gas is discharged from the cryopump housing 70 through the vent valve 88.

The dehydration unit 112 starts the reverse temperature rise operation of the cryocooler 16 along with the opening of the purge valve 84. The dehydration unit 112 may control the operation frequency of the cryocooler 16 so as to make the second measurement terperature T2 coincide with the target heating temperature, based on the second temperature measurement signal S2. Alternatively, the dehydration unit 112 may control the operation frequency of the cryocooler 16 so as to make the first measurement terperature T1 coincide with the target heating temperature, based on the first temperature measurement signal S1. As described above, the target heating temperature is set to, for example, a temperature of 50° C. or higher.

Subsequently, the dehydration unit 112 determines whether or not dehydration completion conditions are satisfied (S202). The dehydration completion conditions include the following (b1) and (b2).

(b1) The measured temperature of the second cryopanel unit 20 is higher than a temperature threshold value.
(b2) A drying time (dehydration waiting time) set in advance has elapsed.

Therefore, the dehydration unit 112 compares the second measurement terperature T2 with the temperature threshold value, based on the second temperature measurement signal S2. The temperature threshold value may be equal to the target heating temperature. The dehydration unit 112 measures an elapsed time and compares the elapsed time with the drying time set in advance. This elapsed time may be calculated from, for example, the point in time when the second measurement terperature T2 reaches the temperature threshold value, or may be calculated from the regeneration start command S7. The drying time set in advance may be set to, for example, a time in a range of from 10 minutes to 60 minutes (for example, 30 minutes). The dehydration unit 112 controls the rough valve 80 and the purge valve 84, based on the results of these comparisons.

In a case where the measured temperature of the second cryopanel unit 20 is lower than the temperature threshold value (No in S202), the current state is maintained. Even in a case where the drying time set in advance has not elapsed (No in S202), the current state is maintained. That is, the purge valve 84 is opened and the rough valve 80 continues to be closed. After the lapse of a predetermined time, it is determined again whether or not the dehydration completion conditions are satisfied (S202).

In a case where the dehydration completion conditions are satisfied (Yes in S202), that is, in a case where the measured temperature of the second cryopanel unit 20 is higher than the temperature threshold value and the drying time set in advance has elapsed, the purge valve 84 is closed (S203). The rough valve 80 continues to be closed during the dehydration sequence. In this way, the dehydration sequence is ended.

If necessary, such as in a case where the amount of purge gas which can be supplied is limited, the dehydration unit 112 may close the purge valve 84 before the dehydration completion conditions are satisfied.

Figure 11:
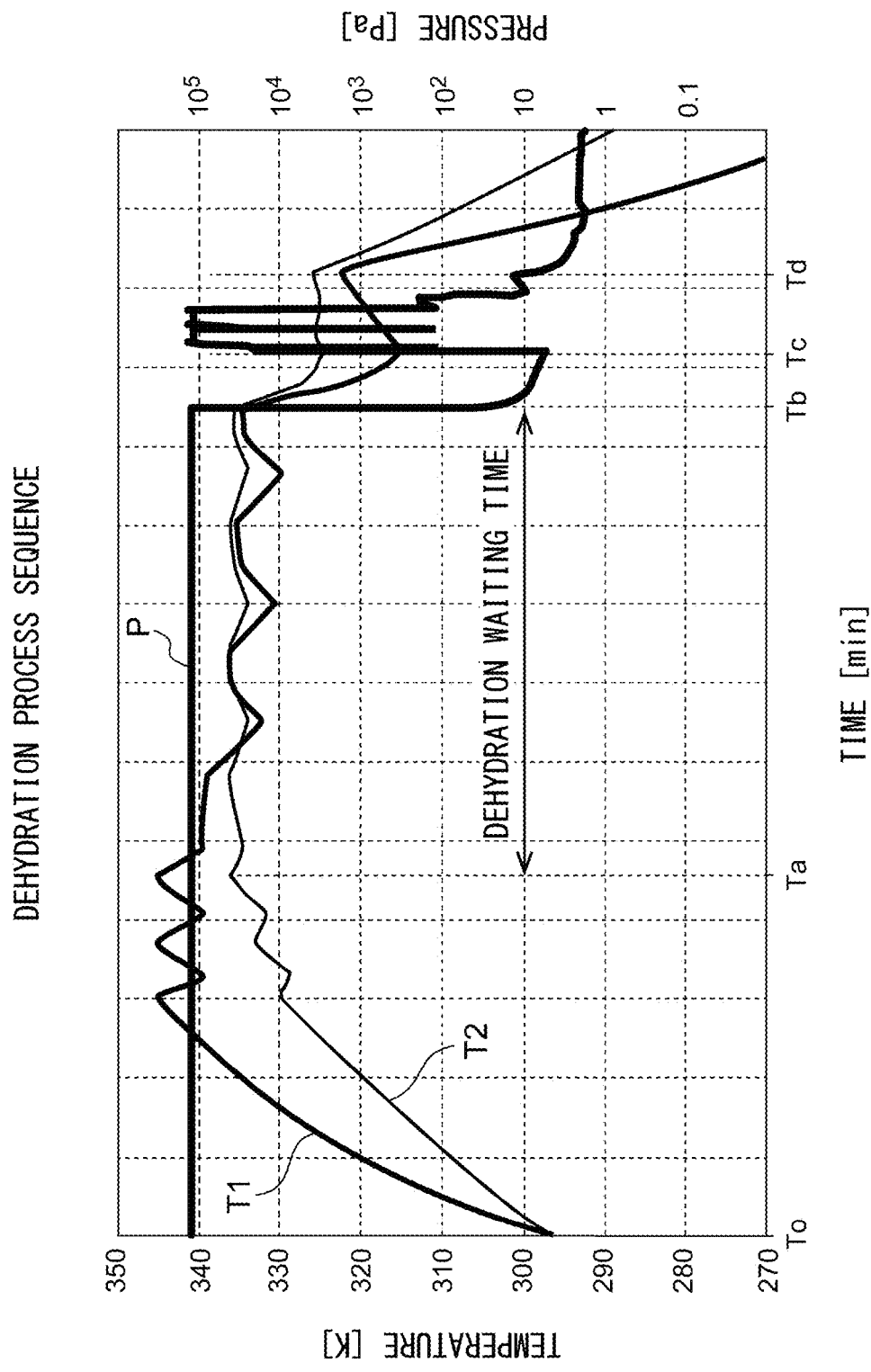
FIG. 11 is a diagram showing an example of temporal changes in temperature and pressure in the regeneration method shown in FIG. 8.

FIG. 11 is a diagram showing an example of temporal changes in temperature and pressure in the regeneration method shown in FIG. 8. In the drawing, symbols T1 and T2 indicate the measured temperatures of the first cryopanel unit 18 and the second cryopanel unit 20, respectively. A temperature value is shown on the vertical axis on the left side. Symbol P indicates the measured internal pressure of the cryopump housing 70, and a pressure value is shown with a logarithm on the vertical axis on the right side.

The process shown in the drawing is a case where the operation of the cryopump 10 is newly started. The entire cryopump 10 is at room temperature, and the internal pressure is atmospheric pressure. At a start time $T_0$ of the regeneration sequence, both the first cryopanel unit 18 and the second cryopanel unit 20 are at about 297 K. Accordingly, the first measurement terperature T1 is higher than the first reference temperature Tr1, and the second measurement temperature T2 is higher than the second reference temperature Tr2. Therefore, the dehydration sequence is first executed according to the flow shown in FIG. 8 (S200 in FIG. 8), and the sublimation regeneration sequence is executed following the dehydration sequence (S100 in FIG. 8).

When the dehydration sequence is started, the purge valve 84 is opened and the rough valve 80 is closed (S201 in FIG. 10). Due to the supply of the purge gas, the measured internal pressure P of the cryopump housing 70 continues to be at about atmospheric pressure. Due to the reverse temperature rise of the cryocooler 16, the first cryopanel unit 18 and the second cryopanel unit 20 (including the non-combustible adsorbent 64) are heated to the target heating temperature (for example, 335 K).

At a timing Ta shown in FIG. 11, the second T2 reaches the target heating temperature. From the point in time when the second measurement terperature T2 reaches the target heating temperature, the controller 100 measures the drying time (dehydration waiting time). The drying time is set to 30 minutes. When the drying time is completed at a timing Tb shown in FIG. 11, it is determined that the dehydration completion conditions are satisfied (S202 in FIG. 10), and the dehydration sequence is ended (S203 in FIG. 10).

Subsequently, the sublimation regeneration sequence is started. Since the cryopump 10 has already been heated, both the first measurement temperature T1 and the second measurement temperature T2 are higher than the purge stop temperature. Therefore, at the timing Tb, the purge valve 84 is closed and the rough valve 80 is opened (S103 in FIG. 9).

When the evacuation (rough evacuation) of the cryopump 10 is performed and the internal pressure of the cryopump 10 becomes sufficiently low, the rough valve 80 is closed and the evacuation of the cryopump 10 is ended (a timing Tc in FIG. 11). More specifically, in a case where the measured internal pressure P of the cryopump housing 70 is lower than a pressure threshold value Pa and the measured temperature T2 of the second cryopanel unit 20 is higher than the temperature threshold value (S104 in FIG. 9), the rough valve 80 is closed (S105 in FIG. 9).

Thereafter, as shown in FIG. 11, a discharge process which includes so-called rough-and-purge may be performed. The rough-and-purge is a process of alternately repeating the supply of the purge gas to the cryopump 10 and the evacuation. The rough-and-purge can help discharge the water vapor adsorbed to the adsorbent. During the rough-and-purge, the internal pressure and the pressure rise rate of the cryopump 10 are monitored, and when these satisfy predetermined values (a timing Td in FIG. 11), the cooldown of the cryopump 10 is started. When each of the first cryopanel unit 18 and the second cryopanel unit 20 is cooled to a target cooling temperature, the regeneration is completed.

As described above, according to the embodiment, the dehydration of the non-combustible adsorbent 64 can be performed before the evacuation operation of the cryopump 10 is started. Even if the non-combustible adsorbent 64 absorbs moisture during the previous work (manufacturing, transportation, storage, installation, or the like), the non-combustible adsorbent 64 can be prevented from being damaged due to evacuation and the cryopump 10 can be operated.

Further, even if the ice accumulated in the cryopump 10 is melted due to a power failure or other abnormal situation that occurs during the evacuation operation of the cryopump 10 and the non-combustible adsorbent 64 is exposed to a high-humidity environment, the cryopump 10 can perform the dehydration sequence to dry the non-combustible adsorbent 64, when recovering from the abnormal situation. In this way, the non-combustible adsorbent 64 can be prevented from being damaged due to evacuation, and the cryopump 10 can be operated.

The controller 100 controls the heating device so as to heat the non-combustible adsorbent 64 and the cryopanel 60 to 50° C. or higher in the dehydration sequence. By using the heating, it is possible to perform the dehydration of the non-combustible adsorbent 64 in a short time.

Further, the controller 100 opens the purge valve 84 so as to supply a purge gas to the cryopump housing 70 in the dehydration sequence. By using the purge gas, it is possible to perform the dehydration of the non-combustible adsorbent 64 in a short time.

Further, the controller 100 continues to close the rough valve 80 during the dehydration sequence. In this way, the internal pressure of the cryopump housing 70 is prevented from being excessively reduced during the dehydration sequence.

According to the sublimation regeneration sequence, due to sublimation, ice is vaporized into water vapor without passing through liquid water. Therefore, the hydrophilic adsorbent does not come into contact with liquid water during the regeneration. Since the amount of water which is adsorbed to the adsorbent is reduced, the time required for dehydrating the adsorbent can be shortened. Therefore, the regeneration time can be shortened. Further, as described above, silica gel has the property of becoming brittle when it is immersed in liquid water and then spontaneously shattering. However, according to the present embodiment, the hydrophilic adsorbent does not come into contact with liquid water during the regeneration. Therefore, in a case where the hydrophilic adsorbent contains silica gel, the hydrophilic adsorbent can be made to last longer.

The present invention has been described above based on the examples. It will be understood by those skilled in the art that the present invention is not limited to the embodiments described above, various design changes can be made, various modification examples can be made, and such modification examples are also within the scope of the present invention. Various features described in connection with an embodiment may also be applicable to other embodiments. A new embodiment that results from the combination also has the effects of each of the embodiments which are combined.

In an embodiment, an additional dehydration sequence may be executed following the basic dehydration sequence described above. The controller 100 (for example, the dehydration unit 112) may be configured to execute the additional dehydration sequence, based on the first temperature measurement signal S1, the second temperature measurement signal S2, and the pressure measurement signal S3. The additional dehydration sequence may be configured to reduce water remaining on the non-combustible adsorbent 64 by the evacuation (rough evacuation) of the cryopump housing 70 through the rough valve 80. Alternatively, the additional dehydration sequence may be configured to reduce water remaining on the non-combustible adsorbent 64 by the rough-and-purge in which the evacuation of the cryopump housing 70 through the rough valve 80 and the supply of the purge gas to the cryopump housing 70 through the purge valve 84 are alternately repeated. The rough-and-purge is illustrated in FIG. 11. Cool-down is performed following the rough-and-purge, and the additional dehydration sequence is completed. In this way, the evacuation operation of the cryopump 10 is started. The additional dehydration sequence may be a part of the sublimation regeneration sequence described above.

Figure 12:
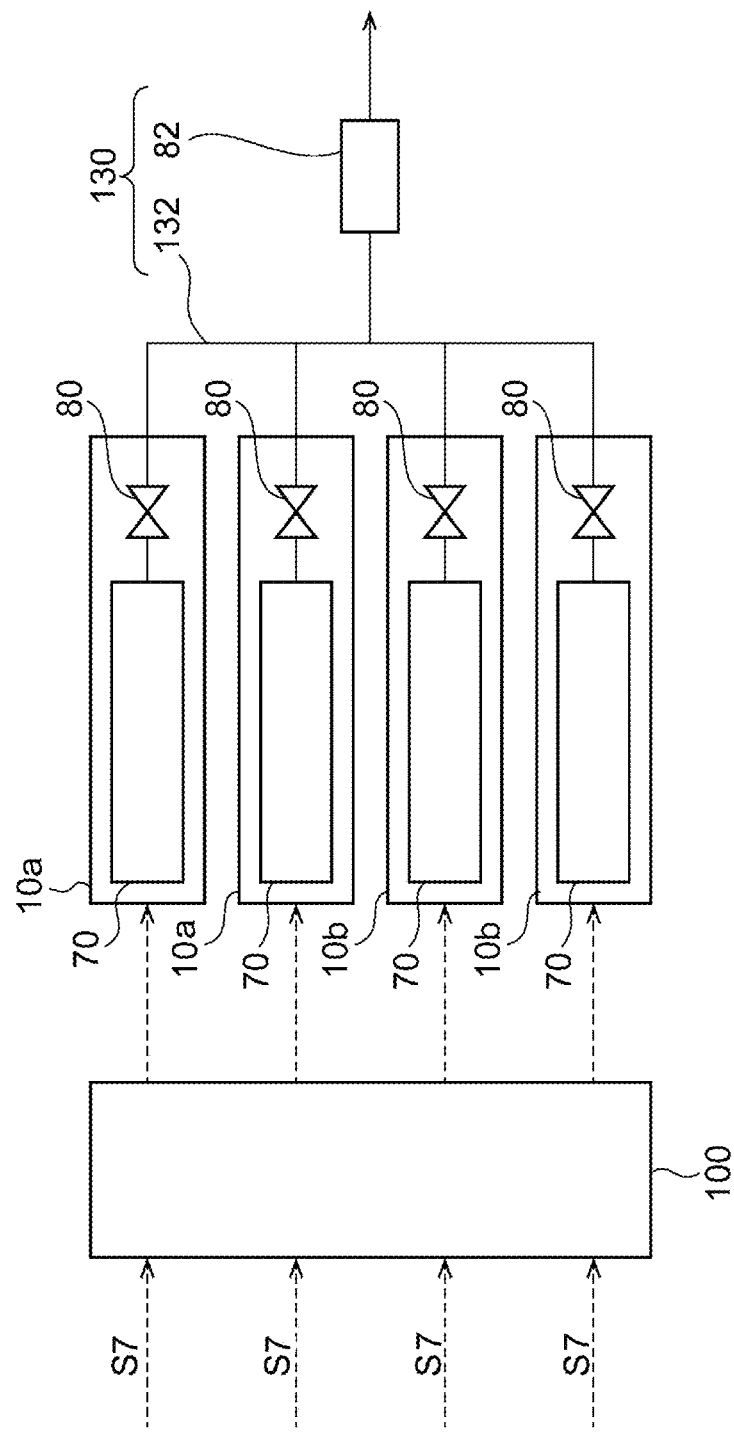
FIG. 12 is a diagram schematically showing a cryopump system according to an embodiment.

FIG. 12 is a diagram schematically showing a cryopump system according to an embodiment. The cryopump system includes a plurality of cryopumps, and specifically includes at least one first cryopump 10a and at least one second cryopump 10b. In the example shown in FIG. 12, the cryopump system includes a total of four cryopumps including two first cryopumps 10a and two second cryopumps 10b. However, the number of first cryopumps 10a and the number of second cryopumps 10b are not particularly limited. The plurality of cryopumps may be installed to separate vacuum chambers, or may be installed to one same vacuum chamber.

The first cryopump 10a is a cryopump having an adsorbent containing silica gel as a main component thereof, and is, for example, the cryopump 10 shown in FIG. 1. The second cryopump 10b is a cryopump having an adsorbent (for example, activated carbon) which does not contain silica gel. The second cryopump 10b has the same configuration as the cryopump 10 shown in FIG. 1 except for the adsorbent. Therefore, the first cryopump 10a includes the cryopump housing 70 and the rough valve 80. Similarly, the second cryopump 10b includes the cryopump housing 70 and the rough valve 80.

The cryopump system includes a rough exhaust line 130. The rough exhaust line 130 includes a rough pump 82 that is common to the first cryopump 10a and the second cryopumps 10b, and a rough pipe 132 that allows the rough valve 80 of each of the cryopumps (10a, 10b) merge with the common rough pump 82. The rough pump 82 is shared by the plurality of first cryopumps 10a and the plurality of second cryopumps 10b.

The controller 100 is configured to receive the regeneration start command S7 for each of the cryopumps (10a, 10b) and start the regeneration of the cryopumps. The regeneration start command S7 is input to the controller 100 from, for example, the input unit 104 (refer to FIG. 7).

Incidentally, since the respective cryopumps (10a, 10b) are connected to each other through the rough exhaust line 130, in a case where the regeneration is performed in parallel by several cryopumps, gas may flow back from a cryopump (referred to as a cryopump A) to another cryopump (referred to as a cryopump B). For example, in a case where the cryopump B shifts from purge to roughing while the rough pump 82 is roughing the cryopump A, at the point in time of the shift, the internal pressure of the cryopump B becomes higher than that of the cryopump A due to the purge gas. Therefore, the gas can flow back from the cryopump B to the cryopump A through the rough pipe 132 due to the pressure difference between the two cryopumps.

Such gas backflow is not desired especially in a case where the cryopump A is the first cryopump 10a. This is because the pressure of the first cryopump 10a increases due to the back-flow and the internal pressure can exceed the triple point pressure of water. In that case, ice can be liquefied into water in the first cryopump 10a. The risk of silica gel contained in the adsorbent coming into contact with liquid water increases.

Further, there is also a concern that particles may enter the cryopump due to the back-flow which is generated from the rough pipe 132 to the cryopumps (10a, 10b).

Therefore, the controller 100 may execute the basic dehydration sequence in parallel in the plurality of first cryopumps 10a, and execute the additional dehydration sequence in sequence in the plurality of first cryopumps 10a. Since the rough valve 80 is closed in the basic dehydration sequence, the problem described above does not occur even if the plurality of first cryopumps 10*a* execute the basic dehydration sequence at the same time. Although the rough valve 80 is opened in the additional dehydration sequence, since the plurality of first cryopumps 10*a* execute the additional dehydration sequence in sequence, the plurality of rough valves 80 are not opened at the same time. Accordingly, it is possible to prevent gas backflow between the plurality of first cryopumps 10*a*.

The rough valve 80 is also opened in the sublimation regeneration sequence described above. Therefore, similarly, the controller 100 may execute the basic dehydration sequence in parallel in the plurality of first cryopumps 10*a* and execute the sublimation regeneration sequence in sequence in the plurality of first cryopumps 10*a*. By doing so, it is possible to prevent gas backflow between the plurality of first cryopumps 10*a*.

Further, in a case where the controller 100 receives the regeneration start command S7 for at least one other cryopump (that is, the second cryopump 10*b*) during the dehydration (the basic dehydration sequence and/or the additional dehydration sequence) of the first cryopump 10*a*, the start of the regeneration of at least one other cryopump may be delayed after the completion of the dehydration of the first cryopump 10*a*. By doing so, it is possible to prevent gas backflow from the second cryopump 10*b* to the first cryopump 10*a*.

The present invention has been described by using specific words and phrases based on the embodiments. However, the embodiments merely show one aspect of the principle and application of the present invention, and the embodiments include many modification examples or changes in disposition within a scope which does not depart from the idea of the present invention defined in the claims.

The present invention can be used in the fields of cryopumps, cryopump systems, and methods for starting an operation of a cryopump.

It should be understood that the invention is not limited to the above-described embodiment, but may be modified into various forms on the basis of the spirit of the invention. Additionally, the modifications are included in the scope of the invention.

What is claimed is:

1. A cryopump comprising:
    a cryopump housing;
    a cryopanel disposed in the cryopump housing and provided with a non-combustible adsorbent;
    a heater that heats the non-combustible adsorbent and the cryopanel;
    a purge valve that is mounted to the cryopump housing and connects the cryopump housing to a purge gas source;
    a rough valve that is mounted to the cryopump housing and connects the cryopump housing to a rough pump;
    a sensor that generates a measurement signal indicating a temperature of the non-combustible adsorbent or an internal pressure of the cryopump housing; and
    a controller that receives a regeneration start command and controls at least one of the heater, the purge valve, and the rough valve based on the measurement signal so as to execute either (i) a sublimation regeneration sequence or (ii) a dehydration sequence,
    the sublimation regeneration sequence configured to sublimate water from the non-combustible adsorbent by exposing the non-combustible adsorbent to a vacuum atmosphere,
    the dehydration sequence configured to dehydrate the non-combustible adsorbent by exposing the non-combustible adsorbent to a dry atmosphere having a higher pressure than the vacuum atmosphere, at room temperature or a temperature higher than the room temperature,
    wherein the sensor includes a temperature sensor that generates a temperature measurement signal indicating a temperature of the non-combustible absorbent, and
    the controller is configured to control at least one of the heater, the purge valve, and the rough valve to execute the dehydration sequence in a case where the non-combustible absorbent is at the room temperature, based on the temperature measurement signal.

2. The cryopump according to claim 1, wherein the controller is configured to control at least one of the heater, the purge valve, and the rough valve to execute the sublimation regeneration sequence in a case where the non-combustible adsorbent is at a temperature lower than the room temperature, based on the temperature measurement signal.

3. The cryopump according to claim 1, wherein the controller is configured to control at least one of the heater, the purge valve, and the rough valve to execute either the sublimation regeneration sequence or the dehydration sequence, based on a state of the cryopump immediately before receiving the regeneration start command instead of the measurement signal.

4. The cryopump according to claim 1, wherein the controller is configured to control the heater to heat the non-combustible adsorbent and the cryopanel to 50° C. or higher in the dehydration sequence.

5. The cryopump according to claim 1, wherein the controller is configured to open the purge valve to supply a purge gas to the cryopump housing in the dehydration sequence.

6. The cryopump according to claim 1, wherein the controller is configured to close the rough valve when the dehydration sequence is started and to continue to close the rough valve during the dehydration sequence.

7. The cryopump according to claim 1, wherein a pressure of the vacuum atmosphere is less than 100 Pa, and a pressure of the dry atmosphere is at least 1000 Pa.

8. The cryopump according to claim 1, wherein a pressure of the dry atmosphere is at least 1 atm.

9. The cryopump according to claim 1, wherein the non-combustible adsorbent contains silica gel as a main component.

10. The cryopump according to claim 1, wherein the cryopump does not include activated carbon.

11. A cryopump comprising:
    a cryopump housing;
    a cryopanel disposed in the cryopump housing and provided with a non-combustible adsorbent;
    a heater that heats the non-combustible adsorbent and the cryopanel;
    a purge valve that is mounted to the cryopump housing and connects the cryopump housing to a purge gas source;
    a rough valve that is mounted to the cryopump housing and connects the cryopump housing to a rough pump;
    a sensor that generates a measurement signal indicating a temperature of the non-combustible adsorbent or an internal pressure of the cryopump housing; and
    a controller that receives a regeneration start command and controls at least one of the heater, the purge valve, and the rough valve based on the measurement signal so as to execute either (i) a sublimation regeneration sequence or (ii) a dehydration sequence, the sublimation regeneration sequence configured to sublimate water from the non-combustible adsorbent by exposing the non-combustible adsorbent to a vacuum atmosphere, the dehydration sequence configured to dehydrate the non-combustible adsorbent by exposing the non-combustible adsorbent to a dry atmosphere having a higher pressure than the vacuum atmosphere, at room temperature or a temperature higher than the room temperature, wherein the controller is configured to control at least one of the heater, the purge valve, and the rough valve to execute an additional dehydration sequence following the dehydration sequence, and the additional dehydration sequence is configured to reduce water remaining in the non-combustible adsorbent by evacuation of the cryopump housing through the rough valve, or by rough-and-purge in which the evacuation and supply of a purge gas to the cryopump housing through the purge valve are alternately repeated.

12. A cryopump system comprising:
the cryopump according to claim 11; and
at least one other cryopump,
wherein the rough pump is shared by the cryopump and the at least one other cryopump, and
the controller is configured to execute the dehydration sequence in parallel in the cryopump and the at least one other cryopump and to execute the additional dehydration sequence in sequence in the cryopump and the at least one other cryopump.

13. The cryopump according to claim 11, wherein the controller is configured to control the heater to heat the non-combustible adsorbent and the cryopanel to 50° C. or higher in the dehydration sequence.

14. The cryopump according to claim 11, wherein the controller is configured to open the purge valve to supply a purge gas to the cryopump housing in the dehydration sequence.

15. The cryopump according to claim 11, wherein the controller is configured to close the rough valve when the dehydration sequence is started and to continue to close the rough valve during the dehydration sequence.

16. A cryopump comprising:
a cryopump housing;
a cryopanel disposed in the cryopump housing and provided with a non-combustible adsorbent;
a heater that heats the non-combustilbe adsorbent and the cryopanel;
a purge valve that is mounted to the cryopump housing and connects the cryopump housing to a purge gas source;
a rough valve that is mounted to the cryopump housing and connects the cryopump housing to a rough pump;
a sensor that generates a measurement signal indicating a temperature of the non-combustible adsorbent or an internal pressure of the cryopump housing; and a controller that receives a regeneration start command and controls at least one of the heater, the purge valve, and the rough valve based on the measurement signal so as to execute either (i) a sublimation regeration sequence or (ii) a dehydration sequence, the sublimation regeneration sequence configured to sublimate water from the non-combustible adsorbent by exposing the non-combustible adsorbent to a vacuum atmosphere, the dehydration sequence configured to dehydrate the non-combustible adsorbent by exposing the non-combustible adsorbent to a dry atmosphere having a higher pressure than the vacuum atmosphere, at room temperature or a temperature higher than the room temperature, wherein the controller is configured to control at least one of the heater, the purge valve, and the rough valve to execute the sublimation regeneration sequence following the dehydration sequence.

17. A cryopump system comprising:
the cryopump according to claim 16; and
at least one other cryopump,
wherein the rough pump is shared by the cryopump and the at least one other cryopump, and
the controller is configured to execute the dehydration sequence in parallel in the cryopump and the at least one other cryopump and to execute the sublimation regeneration sequence in sequence in the cryopump and the at least one other cryopump.

18. The cryopump according to claim 16, wherein the controller is configured to control the heater to heat the non-combustible adsorbent and the cryopanel to 50° C. or higher in the dehydration sequence.

19. The cryopump according to claim 16, wherein the controller is configured to open the purge valve to supply a purge gas to the cryopump housing in the dehydration sequence.

20. The cryopump according to claim 16, wherein the controller is configured to close the rough valve when the dehydration sequence is started and to continue to close the rough valve during the dehydration sequence.

21. A method for starting an operation of a cryopump, the cryopump including a non-combustible adsorbent, the method comprising:
measuring a temperature of the non-combustible adsorbent;
dehydrating the non-combustible adsorbent by exposing the non-combustible adsorbent to a dry atmosphere at room temperature or a temperature higher than the room temperature;
evacuating an environment around the non-combustible adsorbent after the dehydration of the non-combustible adsorbent; and
cooling the non-combustible adsorbent to a cryogenic temperature in a vacuum atmosphere,
wherein the dehydrating is executed in a case where the non-combustible adsorbent is at the room temperature, based on the measured temperature of the non-combustible adsorbent.

* * * * *